US011113318B2

(12) United States Patent
Bhatt et al.

(10) Patent No.: US 11,113,318 B2
(45) Date of Patent: Sep. 7, 2021

(54) CHARACTER BASED MEDIA ANALYTICS

(71) Applicant: The Nielsen Company (US), LLC, New York, NY (US)

(72) Inventors: Meghana Bhatt, Aliso Viejo, CA (US); Rachel Payne, Aliso Viejo, CA (US); Natasha Mohanty, Aliso Viejo, CA (US)

(73) Assignee: The Nielsen Company (US), LLC, New York, NY (US)

( * ) Notice: Subject to any disclaimer, the term of this patent is extended or adjusted under 35 U.S.C. 154(b) by 304 days.

(21) Appl. No.: 16/130,915

(22) Filed: Sep. 13, 2018

(65) Prior Publication Data
US 2019/0012368 A1 Jan. 10, 2019

Related U.S. Application Data

(63) Continuation of application No. 15/132,197, filed on Apr. 18, 2016, now Pat. No. 10,565,235, which is a (Continued)

(51) Int. Cl.
*G06F 16/28* (2019.01)
*G06F 16/43* (2019.01)
(Continued)

(52) U.S. Cl.
CPC .......... *G06F 16/288* (2019.01); *G06F 16/43* (2019.01); *G06F 16/435* (2019.01); *G06F 16/44* (2019.01);
(Continued)

(58) Field of Classification Search
CPC ...... G06F 16/288; G06F 16/435; G06F 16/43; G06F 16/44; G06F 16/951; G06F 16/7867
(Continued)

(56) References Cited

U.S. PATENT DOCUMENTS 7,970,922 B2 * 6/2011 Svendsen ........... H04N 7/17318
709/231
8,150,695 B1 * 4/2012 Killalea ................ G10L 13/033
704/270
(Continued)

FOREIGN PATENT DOCUMENTS

| EP | 2239670 A1 | 10/2010 |
|---|---|---|
| WO | 2007/063468 A1 | 6/2007 |
| WO | 2013/142538 A1 | 9/2013 |

OTHER PUBLICATIONS

Notice of Allowance received for U.S. Appl. No. 13/844,125, dated Aug. 29, 2013, 18 pages.
(Continued)

*Primary Examiner* — Phong H Nguyen
(74) *Attorney, Agent, or Firm* — McDonnell Boehnen Hulbert & Berghoff LLP

(57) ABSTRACT

Techniques for analyzing media content are described. One technique generally comprises performing a regression analysis for characters in a plurality of media content based on user demographics, content outcome measure, and character models. The technique determines an attribute of significance. In some embodiments, the technique selects media content for display that depicts a character having at least a threshold value of the attribute of significance. In some embodiments, the technique displays media analytics for the attribute of significance determined based on a value of the attribute of significance exceeding a threshold significance value.

13 Claims, 8 Drawing Sheets

Characters and their Attributes | Character Models

102
Sheldon: Male, Scientist, Unattractive, Unfriendly → 116 (-1, 1, -1, -1)

104
Leonard: Male, Scientist, Neutral Attractive, Friendly → 118 (-1, 1, 0, 1)

106
Penny: Female, Non-scientist, Attractive, Friendly → 120 (1, -1, 1, 1)

108
Howard: Male, Scientist, Unattractive, Friendly → 122 (-1, 1, -1, 1)

110
Rajesh: Male, Scientist, Neutral Attractive, Friendly → 124 (-1, 1, 0, 1)

112
Bernadette: Female, Scientist, Attractive, Friendly → 126 (1, 1, 1, 1)

114
Amy: Female, Scientist, Unattractive, Unfriendly → 128 (1, 1, -1, -1)

Related U.S. Application Data continuation of application No. 14/636,067, filed on Mar. 2, 2015, now Pat. No. 9,342,580, which is a continuation-in-part of application No. 14/466,882, filed on Aug. 22, 2014, now Pat. No. 9,122,684, which is a continuation of application No. 14/065,332, filed on Oct. 28, 2013, now Pat. No. 8,819,031, which is a continuation of application No. 13/844,125, filed on Mar. 15, 2013, now Pat. No. 8,572,097.

(60) Provisional application No. 61/947,990, filed on Mar. 4, 2014.

(51) Int. Cl.
G06F 16/44 (2019.01)
G06F 16/951 (2019.01)
G06F 16/78 (2019.01)
G06F 16/435 (2019.01)

(52) U.S. Cl.
CPC ........ G06F 16/7867 (2019.01); G06F 16/951 (2019.01)

(58) Field of Classification Search
USPC ........................................ 707/722, 736, 748
See application file for complete search history.

(56) References Cited

U.S. PATENT DOCUMENTS

| | | | | |
|---|---|---|---|---|
| 8,184,797 | B1* | 5/2012 | Rosen | H04M 3/4931 379/218.01 |
| 8,250,206 | B2* | 8/2012 | Horii | G06F 16/00 709/224 |
| 8,260,117 | B1 | 9/2012 | Xu et al. | |
| 8,301,624 | B2* | 10/2012 | Park | G06F 16/335 707/723 |
| 8,413,218 | B1* | 4/2013 | Hopkins | G06F 21/6254 726/4 |
| 8,572,097 | B1 | 10/2013 | Payne et al. | |
| 8,701,139 | B2 | 4/2014 | Scott et al. | |
| 8,819,031 | B1 | 8/2014 | Payne et al. | |
| 8,825,574 | B2* | 9/2014 | Bodor | G06Q 30/02 706/18 |
| 9,122,684 | B2 | 9/2015 | Payne et al. | |
| 9,342,580 | B2 | 5/2016 | Bhatt et al. | |
| 9,442,931 | B2 | 9/2016 | Payne et al. | |
| 9,471,606 | B1* | 10/2016 | Pedregal | G06F 16/24 |
| 9,805,034 | B2 | 10/2017 | Payne et al. | |
| 2002/0199186 | A1* | 12/2002 | Ali | H04N 21/6543 725/28 |
| 2006/0031115 | A1* | 2/2006 | Eisma | G06Q 10/063112 705/7.14 |
| 2007/0130585 | A1* | 6/2007 | Perret | H04N 21/26216 725/46 |
| 2008/0146343 | A1* | 6/2008 | Sullivan | A63F 13/12 463/42 |
| 2008/0221989 | A1* | 9/2008 | Messer | G06Q 30/02 705/14.69 |
| 2009/0132364 | A1* | 5/2009 | Agarwal | G06Q 30/0267 705/14.61 |
| 2009/0193077 | A1* | 7/2009 | Horii | G06F 16/00 709/203 |
| 2009/0287685 | A1* | 11/2009 | Charnock | G06F 16/38 707/999.005 |
| 2009/0326947 | A1* | 12/2009 | Arnold | G06Q 30/02 704/257 |
| 2010/0100516 | A1* | 4/2010 | Zhou | G06N 5/02 706/46 |
| 2010/0153885 | A1* | 6/2010 | Yates | H04N 21/4532 715/841 |
| 2010/0191689 | A1* | 7/2010 | Cortes | G06F 16/783 706/46 |
| 2010/0250556 | A1* | 9/2010 | Park | G06F 16/335 707/749 |
| 2011/0107373 | A1* | 5/2011 | Scott | H04N 21/251 725/40 |
| 2011/0122255 | A1 | 5/2011 | Haritaoglu | |
| 2012/0030228 | A1* | 2/2012 | Naidu | G06F 16/951 707/767 |
| 2012/0056752 | A1* | 3/2012 | Baldwin | H04N 21/25891 340/870.01 |
| 2012/0060116 | A1* | 3/2012 | Baldwin | H04N 21/4312 715/810 |
| 2012/0078830 | A1* | 3/2012 | Bodor | G06Q 30/02 706/46 |
| 2012/0079516 | A1 | 3/2012 | Phielipp | |
| 2012/0079529 | A1* | 3/2012 | Harris | H04N 21/4755 725/32 |
| 2012/0110087 | A1* | 5/2012 | Culver | G06Q 10/103 709/205 |
| 2012/0272259 | A1* | 10/2012 | Cortes | H04N 21/4668 725/14 |
| 2013/0028571 | A1* | 1/2013 | Sato | H04N 5/76 386/230 |
| 2013/0054593 | A1 | 2/2013 | Park et al. | |
| 2013/0111526 | A1* | 5/2013 | Glowaty | H04N 21/4826 725/53 |
| 2014/0164507 | A1* | 6/2014 | Tesch | H04L 51/10 709/204 |
| 2014/0215017 | A1* | 7/2014 | Yeh | H04N 21/234309 709/219 |
| 2015/0086173 | A1* | 3/2015 | Abecassis | H04N 21/8126 386/201 |
| 2016/0232160 | A1* | 8/2016 | Buhrmann | G06F 16/367 |
| 2016/0306872 | A1 | 10/2016 | Bhatt et al. | |
| 2018/0137122 | A1 | 5/2018 | Payne et al. | |
| 2018/0365240 | A1 | 12/2018 | Payne et al. | |
| 2018/0373715 | A1 | 12/2018 | Payne et al. | |
| 2018/0373716 | A1 | 12/2018 | Payne et al. | |
| 2019/0005039 | A1 | 1/2019 | Payne et al. | |
| 2019/0034521 | A1 | 1/2019 | Bhatt et al. | |

OTHER PUBLICATIONS

Non-Final Office Action received for U.S. Appl. No. 14/065,332, dated Dec. 18, 2013, 11 pages.
Notice of Allowance received for U.S. Appl. No. 14/065,332, dated Apr. 25, 2014, 8 pages.
International Search Report and Written Opinion received for PCT Patent Application No. PCT/US2014/028582, dated Sep. 18, 2014, 7 pages.
Non-Final Office Action received for U.S. Appl. No. 14/466,882, dated Oct. 21, 2014, 12 pages.
Letter Restarting Period for Response received for U.S. Appl. No. 14/466,882, dated Nov. 21, 2014, 12 pages.
Notice of Allowance received for U.S. Appl. No. 14/466,882, dated May 14, 2015, 9 pages.
Invitation to Pay Additional Fees received for PCT Patent Application No. PCT/US2015/018511, dated May 21, 2015, 2 pages.
Non-Final Office Action received for U.S. Appl. No. 14/636,067, dated Jul. 9, 2015, 8 pages.
International Search Report and Written Opinion received for PCT Patent Application No. PCT/US2015/018511, dated Jul. 28, 2015, 11 pages.
International Preliminary Report on Patentability received for PCT Patent Application No. PCT/US2015/018511, dated Sep. 15, 2016, 8 pages.
International Preliminary Report on Patentability received for PCT Patent Application No. PCT/US2014/028582, dated Sep. 24, 2015, 6 pages.
Non-Final Office Action received for U.S. Appl. No. 14/800,020, dated Dec. 18, 2015, 21 pages.
Notice of Allowance received for U.S. Appl. No. 14/636,067, dated Jan. 13, 2016, 11 pages.
Notice of Allowance received for U.S. Appl. No. 14/800,020, dated May 16, 2016, 10 pages.

(56) References Cited

OTHER PUBLICATIONS

Extended European Search Report received for European Patent Application No. 14764486.8, dated Aug. 4, 2016, 8 pages
Non-Final Office Action received for U.S. Appl. No. 15/238,677, dated Oct. 7, 2016, 14 pages.
Final Office Action received for U.S. Appl. No. 15/238,677, dated Apr. 6, 2017, 11 Pages.
Notice of Allowance received for U.S. Appl. No. 15/238,677, dated Jun. 21, 2017, 10 pages.
Extended European Search Report (includes Supplementary European Search Report and European Search Opinion) received for European Patent Application No. 15757812.1, dated Aug. 4, 2017, 8 pages.
Office Action received for European Patent Application No. 14764486.8, dated Jan. 25, 2018, 8 pages.
Non-Final Office Action received for U.S. Appl. No. 15/132,197, dated Aug. 8, 2018, 20 pages.
Final Office Action received for U.S. Appl. No. 15/132,197, dated Jan. 30, 2019, 18 Pages.
Non-Final Office Action received for U.S. Appl. No. 15/132,197, dated Jun. 11, 2019, 14 pages.

\* cited by examiner

| Characters and their Attributes | Character Models |
|---|---|
| 102 | 116 |
| Sheldon: Male, Scientist, Unattractive, Unfriendly → | (-1, 1, -1, -1) |
| 104 | 118 |
| Leonard: Male, Scientist, Neutral Attractive, Friendly → | (-1, 1, 0, 1) |
| 106 | 120 |
| Penny: Female, Non-scientist, Attractive, Friendly → | (1, -1, 1, 1) |
| 108 | 122 |
| Howard: Male, Scientist, Unattractive, Friendly → | (-1, 1, -1, 1) |
| 110 | 124 |
| Rajesh: Male, Scientist, Neutral Attractive, Friendly → | (-1, 1, 0, 1) |
| 112 | 126 |
| Bernadette: Female, Scientist, Attractive, Friendly → | (1, 1, 1, 1) |
| 114 | 128 |
| Amy: Female, Scientist, Unattractive, Unfriendly → | (1, 1, -1, -1) |

FIG. 1

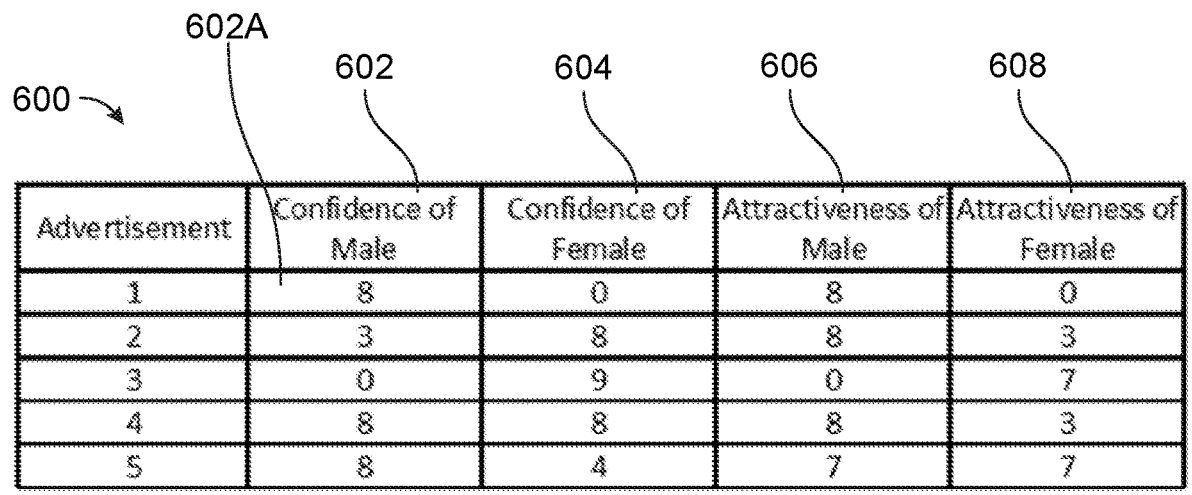
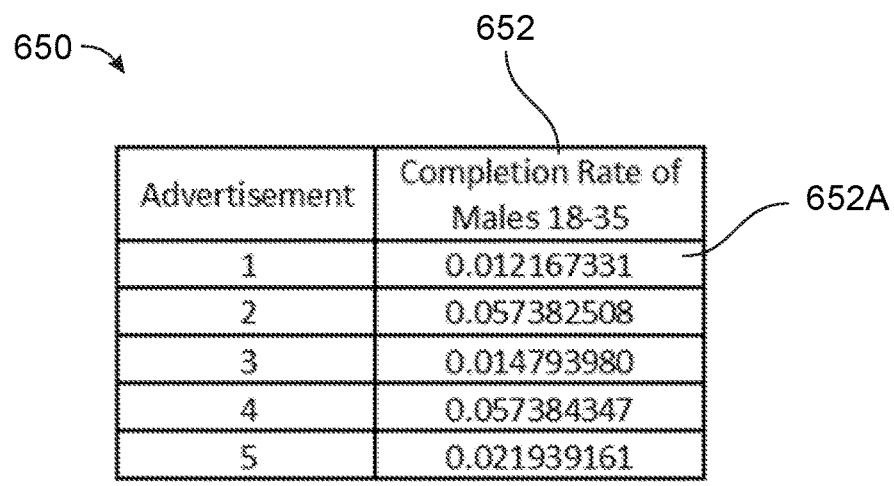
FIG. 6

CHARACTER BASED MEDIA ANALYTICS

CROSS-REFERENCE TO RELATED APPLICATIONS

This disclosure is a Continuation of U.S. application Ser. No. 15/132,197, filed on Apr. 18, 2016, which is a Continuation of U.S. application Ser. No. 14/636,067, filed on Mar. 2, 2015 and issued as U.S. Pat. No. 9,342,580, which is a Continuation-In-Part of U.S. application Ser. No. 14/466,882, filed on Aug. 22, 2014, which is a Continuation of U.S. application Ser. No. 14/065,332, filed on Oct. 28, 2013 and issued as U.S. Pat. No. 8,819,031 on Aug. 26, 2014, which is a Continuation of U.S. application Ser. No. 13/844,125, filed on Mar. 15, 2013 and issued as U.S. Pat. No. 8,572,097 on Oct. 29, 2013, which in turn claims the benefit of U.S. Provisional Application No. 61/947,990, filed on Mar. 4, 2014, the entirety of each of which is hereby incorporated herein by reference.

BACKGROUND

1. Field

The present disclosure relates generally to the field of character-based media analytics and, more particularly, to character-based media analytics using character decompositions.

2. Related Art

As media such as television shows and movies have become more ubiquitous and easily accessible in the everyday lives of consumers, the quantity and diversity of the media have also significantly increased. Previously, consumers were limited to a few television channels broadcasted by major television networks. As technology has progressed, various media are available for on-demand viewing at the convenience of consumers. As this on-demand ability has become more prevalent in the television industry (e.g., on-demand movies) and the personal computing industry (e.g., YouTube video streaming, NetFlix movie recommendations), consumers have become overwhelmed with the availability of choices at any one time. Similarly, consumers' ability to search through media to discover new content that meets their personal preferences and tastes has remained inefficient and ineffective.

Traditional techniques for discovering new media rely on friends and acquaintances suggesting media that they believe the consumer may enjoy. Alternatively, the consumer may see a preview for media that captures their attention or the consumer may view media because it includes a favorite actor or actress. However, these techniques have a significant drawback in that they use only a very narrow degree of precision in identifying content and can be unreliable. For example, although a favorite actress may play the role of an educated, humble, and empowering individual in one movie, the same actress may play the role of an illiterate, ill-mannered, and unfavorable individual in a subsequent movie. Therefore, understanding the qualities of characters is helpful for appreciating and understanding the media in which the characters appear.

Accordingly, techniques for efficiently and reliably decomposing the attributes of characters for character-based media analytics are advantageous.

BRIEF DESCRIPTION OF THE DRAWINGS

FIG. 1 illustrates character models in vector space for multiple characters.

FIG. 6 illustrates exemplary predictor data and outcome measures.

BRIEF SUMMARY

Figure 2:
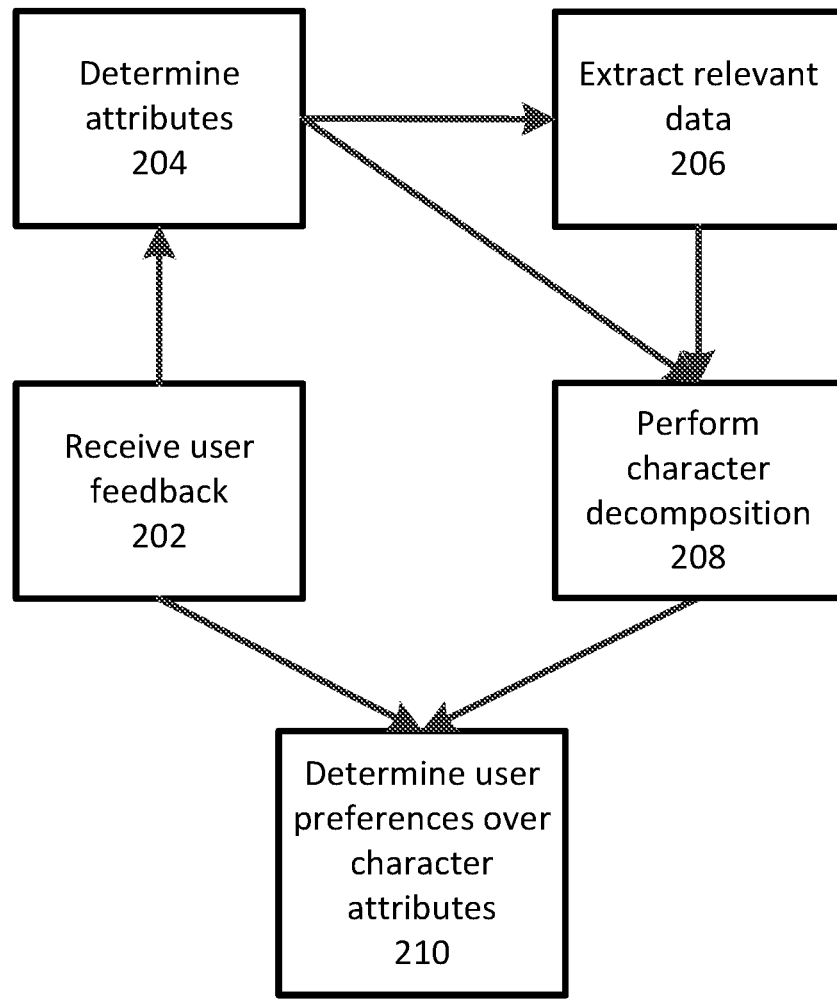
FIG. 2 illustrates an exemplary block diagram for performing discovery and organization of characters and media content.

Systems and processes for analyzing media content is described. The technique generally comprising: accessing demographics information of a plurality of users to identify a subset of the plurality of users; accessing outcome measure information of the subset of the plurality of users, the outcome measure information relating to a plurality of media content, the plurality of media content comprising a first media content and a second media content; calculating a first outcome measure for the first media content, the first outcome measure based on the outcome measure information; calculating a second outcome measure for the second media content, the second outcome measure based on the outcome measure information; accessing respective character models of one or more characters depicted in the first media content; accessing respective character models of one or more characters depicted in the second media content; determining, for the first media content: a first attribute value of a first attribute of the one or more characters depicted in the first media content, the determination based on the respective character models and in accordance with a first capture function; and a second attribute value of a second attribute of the one or more characters depicted in the first media content, the determination based on the respective character models and in accordance with a second capture function; determining, for the second media content: a third attribute value of the first attribute of the one or more characters depicted in the second media content, the determination based on the respective character models and in accordance with the capture function; and a fourth attribute value of the second attribute of the one or more characters depicted in the second media content, the determination based on the respective character models and in accordance with the capture function; and performing a regression using the first attribute value, the second attribute value, the third attribute value, the fourth attribute value, the first outcome measure, and the second outcome measure to determine at least one attribute of significance.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the broadest scope consistent with the claims.

The embodiments described herein include technologies directed to enabling the organization and discovery of characters and media content based on the characters (or attributes of the characters) present in the media. Further, the embodiments described herein include technologies directed to enabling character-based analytics for media content. Media and media content refer to content for storing or delivering information. For example, media content may include television shows, movies, YouTube videos, digital streaming Internet videos, books, poems, stories, audio files, advertisements, news, articles, images, and the like.

A character refers to a persona. For example, characters may include politicians, actors/actresses, real-world persons, book characters, narrators, and anthropomorphized entities within the content being analyzed, and the like. Attributes of characters refer to qualities of the characters. For example, the character's career (e.g., scientist, lawyer, doctor, secretary), demographic (e.g., age, gender, race, parental status), location (e.g., urban, rural), social traits (e.g., nice, loyal, funny, leader, popular, friendly), physical traits (e.g., tall, short, weight, attractiveness), intellectual traits (e.g., competent at a particular task, intelligent, hard-working, good at math), life traits (e.g., underdog, spoiled), and the like are attributes of characters. Attributes may be represented in a binary space, such as differentiating between a character being "nice" or "not nice." Attributes may also be represented in a continuous space, such as differentiating the degree to which a character is nice on a real number scale of 0 to 10, −10 to 10, 0 to 100, or the like.

When considering longer form content such as television shows and movies the character attributes that can be reliably assigned to a character may be of a more persistent and sustained nature (e.g. attractiveness, leadership, or whether the characters are respected). While these traits are by no means fixed, they change over long periods of time so that that values of an attribute (e.g., attractiveness) may be assigned to a character in a movie or even a long running show.

For shorter form media content, such as some content found in online video platforms, the space of attributes that can be reliably and specifically attributed to characters in that content expands considerably to include those attributes that persist over much shorter periods of time. Specifically, assignable attributes can be expanded to further include emotional and motivational states referenced above. For example, a popular video clip may be feature a person being outraged about some injustice. This more transient state of outrage is a salient and important feature of the character that can be used for both curation and analytics in a similar way as the more persistent attributes of the character for short form content, while contextualized in a longer piece of content, like a movie, it would be less specifically salient as a feature for either analytics or curation.

A set of illustrative, though not exhaustive, examples of emotional states that may be used for both curation and analytics of short-form video content includes: anger, outrage, excitement, elation, and pride. In addition to emotional states, motivational states of the characters may be used, such as what the character is pursuing in the moment illustrated by the media content. In many cases, these motivations are tied to the more persistent attributes of the characters. For example, characters may be in pursuit of being attractive, intelligent, knowledgeable, likeable, wealthy, or nurturing. Continuing the above example, the outrage expressed may be paired with some action to repair the injustice, displaying a motivation to improve the world and one's community. In other characters, the motivations may actually be in pursuit of more short term needs and desires, such as satisfying hunger or thirst.

A consumer may enjoy a particular television show because of the positive message portrayed by a character in the show. This positive message is often based on multiple attributes of the characters in the show, rather than strictly the characters' actions or the content of the character's verbal speech. For example, attractive female characters that are depicted as confident and intelligent portray a positive message. To understand why the consumer is attracted to a character, it is helpful to build a character model that captures the character's attributes. A character preference function based on the consumer's preferred attributes may also be developed by either directly eliciting why a particular consumer likes or relates to characters, or simply by inferring a preference function based on a set of preferred and/or non-preferred characters. Character models and character preference functions are used to recommend media to a consumer, rate the likelihood that a consumer will enjoy or respond to particular piece of content, recommend new characters to a consumer, recommend or deliver other content to the consumer, or rate the likelihood that a consumer will enjoy a particular character or piece of content.

Character Models in Vector Space

FIG. 1 illustrates character models in vector space for multiple characters. In FIG. 1, character models 116-128 are mapped out based on the attributes of the characters 102-114 from the television show The Big Bang Theory. The Big Bang Theory television show is a sitcom that brings together a wide array of characters ranging from geeky, intellectual characters with limited social skills to characters that are less educated, but socially adept. Each character model illustrated in FIG. 1 captures a multidimensional representation of the attributes of an associated character. In this example, each of the character models 116-128 is stored in the form of a vector. One of ordinary skill in the art will appreciate that the character models may be stored using various methodologies.

In the example of FIG. 1, the vectors for character models 116-128 are four-dimensional. The value in the first dimension of each character model is based on the character's gender, with female represented by 1 and male represented by a −1. The value in the second dimension of each character model is based on whether the character is a scientist, with scientist represented by 1 and non-scientist represented by −1. The value in the third dimension of each character model is based on the attractiveness of the character, with −1 representing unattractive, 0 representing neutral attractive, and 1 representing attractive. The value in the fourth dimension of each character model is based on whether the character is friendly, with 1 representing friendly and −1 representing unfriendly.

In The Big Bang Theory sitcom, Sheldon 102 is a male theoretical physicist researching quantum mechanics and string theory. Sheldon has B.S., M.S., M.A., Ph.D., and Sc.D. degrees. He is an unfriendly introvert who is physically unattractive. Sheldon's 102 attributes are mapped to vector 116. Vector 116 is (−1, 1, −1, −1). Vector 116 is annotated for clarity as (−1 [male], 1 [scientist], −1 [unattractive], −1 [unfriendly]).

Leonard 104 is a male physicist on The Big Bang Theory. He received his Ph.D. at the age of 24. His physical attractiveness is neutral, meaning he is neither attractive nor unattractive, and he is friendly. Leonard's 104 attributes are mapped to vector 118. Vector 118 is (−1, 1, 0, 1). Vector 118 is annotated for clarity as (−1 [male], 1 [scientist], 0 [neutral attractive], 1 [friendly]).

Penny 106 is a friendly, attractive, tall, blonde, female waitress who is pursuing a career in acting. Penny's 106 attributes are mapped to vector 120. Vector 120 is (1, −1, 1, 1). Vector 120 is annotated for clarity as (1 [female], −1 [nonscientist], 1 [attractive], 1 [friendly]).

Howard 108 is a male aerospace engineer and has an M.Eng. degree. He is socially outgoing and friendly but is physically unattractive. Howard's 108 attributes are mapped to vector 122. Vector 122 is (−1, 1, −1, 1). Vector 122 is annotated for clarity as (−1 [male], 1 [scientist], −1 [unattractive], 1 [friendly]).

Rajesh 110 is a male particle astrophysicist at Caltech and has a Ph.D. His physical attractiveness is neutral and he is friendly. Rajesh's 110 attributes are mapped to vector 124. Vector 124 is (−1, 1, 0, 1). Vector 124 is annotated for clarity as (−1 [male], 1 [scientist], 0 [neutral attractive], 1 [friendly]).

Bernadette 112 is a female with a Ph.D. in microbiology. She is both attractive and friendly. Bernadette's 112 attributes are mapped to vector 126. Vector 126 is (1, 1, 1, 1). Vector 126 is annotated for clarity as (1 [female], 1 [scientist], 1 [attractive], 1 [friendly]).

Amy 114 is a female who has a Ph.D. in neurobiology. She is unfriendly and physically unattractive. Amy's 114 attributes are mapped to vector 128. Vector 128 is (1, 1, −1, −1). Vector 128 is annotated for clarity as (1 [female], 1 [scientist], −1 [unattractive], −1 [unfriendly]).

Vector Space Driven Searches

Character models described in vector space may be used for various searches. In one example, character models 116-128 of FIG. 1 may be used to quickly and accurately identify all characters that exhibit a particular attribute. To identify all characters that are attractive, a search is conducted where an equality test is performed on the third element of the character model vectors. As discussed above and described in the example of FIG. 1, the third dimension (or third value) of each vector indicates the attractiveness of the associated character. All character models with a value greater than zero as the third dimension of the vector are associated with an attractive character. In the example of FIG. 1, Penny and Bernadette are quickly and accurately identified as being attractive by determining that they have an attractiveness value that is greater than 0.

Similarly, Sheldon, Howard, and Amy can be quickly and accurately identified as unattractive as they have an attractiveness value that is less than 0, indicating they are unattractive. As discussed above, the second dimension (or second value) of the character models 116-128 describe whether the character is a scientist or nonscientist. A search for all scientists would identify all character models with a value of 1 in the second dimension. In the example illustrated in FIG. 1, a search for scientists returns results for Sheldon, Leonard, Howard, Rajesh, Bernadette, and Amy—everyone except Penny.

Additionally, a search for a particular characteristic of a character may depend on multiple dimensions of the character model vector. For example, a search for a "scientist" may be conducted by identifying characters with character models that identify them as both "likes science" and "good at science."

Vector space may also be used to determine the distance between characters. This distance is representative of how related (similar or dissimilar) two characters are to each other. Several techniques may be employed to determine the distance between two characters.

Using a first technique, the distance d between a first character $\vec{x}$ associated with a first character model vector $(x_1, x_2, x_3, x_4)$ and a second character $\vec{y}$ associated with a second character model vector $(y_1, y_2, y_3, y_4)$ can be determined using the weighted Euclidean distance:

$$d(\vec{x}, \vec{y}) = \sqrt{\beta_1(x_1 - y_1)^2 + \beta_2(x_2 - y_2)^2 + \beta_3(x_3 - y_3)^2 + \beta_4(x_4 - y_5)^2}$$

More generally, the weighted Euclidean distance d between a first character $\vec{x}$ and a second character $\vec{y}$ for an N-dimensional space can be calculated using the following equation:

$$d(\vec{x}, \vec{y}) = \sqrt{\Sigma_{i=1}^{n} \beta_i (x_i - y_i)^2}$$

As an example of this first technique, the distance between Sheldon and Leonard can be computed using the character models 116 and 118 of FIG. 1 as the following, assuming the weights $\beta_i = 1$ for all i:

$$d(\text{Sheldon}, \text{Leonard}) = \sqrt{((-1)-(-1))^2 + (1-1)^2 + ((-1)-0)^2 + ((-1)-1)^2} = \sqrt{5}$$

As illustrated by this calculation, elements of the character models that have the same value do not contribute to the distance. Thus, if two characters have identical character models, their distance will be 0. In the case of Sheldon and Leonard, they share many, but not all, attributes. In particular, the differences between Sheldon and Leonard are their attractiveness and their friendliness. The squared difference in friendliness has a larger contribution (i.e., 4) than the contribution (i.e., 1) resulting from the squared difference in attractiveness. As a result, the distance between the two characters is the square root of 5.

Using a second technique, the distance d between a first character $\vec{x}$ associated with a first character model vector $(x_1, x_2, x_3, x_4)$ and a second character $\vec{y}$ associated with a second character model vector $(y_1, y_2, y_3, y_4)$ can be determined by performing a comparison of values of the character models:

$$d(\vec{x}, \vec{y}) = (x_1 != y_1) + (x_2 != y_2) + (x_3 != y_3) + (x_4 != y_4)$$

In this comparison, the result of two compared values is 1 when they are not equal. Similarly, the result of two compared values is 0 when they are equal. If $x_1$ and $y_1$ are not equal, the value of $(x_1 != y_1)$ will be 1. This will contribute a value of 1 to the distance $d(\vec{x}, \vec{y})$. Alternatively, if $x_1$ and yore equal, the value of $(x_1 != y_1)$ will be 0. This will not contribute to the distance $d(\vec{x}, \vec{y})$. Accordingly, distance is less for characters using this second technique when the characters share attributes. This type of function is generally useful for attributes that can take on multiple values, but are not obviously orderable—such as race or hair color.

Once again, it might be true that certain attributes are more important either in general, or to a specific user than others. This can once again be represented by a set of "weights" $\beta_i$. More generally, the distance d between a first character $\vec{x}$ and a second character $\vec{y}$ for an N-dimensional space can be calculated using the following equation:

$$d(\vec{x}, \vec{y}) = \sum_{i=1}^{n} \beta_i (x_i \mathrel{!=} y_i)$$

As an example of this second technique, the distance between Sheldon and Leonard can be computed using the character models 116 and 118 of FIG. 1 as the following:

$d(\text{Sheldon,Leonard})=((-1)!=(-1))+(1!=1)+((-1)!=0)+((-1)!=1)=2$

As illustrated by this calculation, elements of the character models that have the same value do not contribute to the distance. Thus, if two characters have identical character models, their distance will be 0. In the case of Sheldon and Leonard, they share many, but not all, attributes. In particular, the differences between Howard and Rajesh are attractiveness and friendliness. The two differences each contribute the same amount to the distance (i.e., 1). As a result, the distance between the two characters is 2.

Both of these techniques use simple, symmetric functions often used to compute distances in vector spaces. However, in the case of characters it may be true that when computing the distance from a first character $\vec{x}$ to a second character $\vec{y}$ you may consider attributes "important" to character $\vec{x}$ more important, while when computing the converse distance from character $\vec{y}$ to character $\vec{x}$ you would consider attributes "important" to character $\vec{y}$. For example—we might decide that whenever a character was "neutral" on a particular attribute, the "weight" on that attribute is 0, and otherwise the "weight" on that attribute should be one. In this case the distance from Sheldon to Leonard:

$$d(\text{Sheldon, Leonard}) = \sqrt{(1(-1--1)^2 + 1(-1--1)^2 + 1(-1-0)^2 + 1(-1-1)^2}$$
$$= \sqrt{5}$$

However, $d(\text{Leonard,Sheldon})= \sqrt{(1(-1--1)^2+1(-1--1)^2+0(0--1)^2+1(1--1)^2}=2$ Thus, the distance from Sheldon to Leonard is greater than the distance from Leonard to Sheldon because "appearance" is more salient to Sheldon's character than Leonard's. There are many other ways in which these distance functions might be complicated to accommodate features of the character space, or of the specific user.

In full generality, any function taking two elements in the character space to a scalar could be used as a distance function. For distance d:

$d{:}(\mathbb{R}^n \times \mathbb{R}^n) \to \mathbb{R}$

In another example, both the first and second techniques for determining distance between two characters will result in larger distances between Penny and Sheldon than were computed for Sheldon and Leonard. The distances between Penny and Sheldon will be at their maximum for the two techniques because Penny and Sheldon are exact opposites on all four dimensions of their character models.

As discussed above, the distance between characters represents the degree of similarity between the characters. Thus, when it is known that a consumer likes a particular character, a computing system can recommend additional characters that have a relatively low distance from the known character. The system may recommend all known characters that have a distance from the known character that is below a certain threshold. Alternatively, or in addition, the system may recommend X number of closest characters, where X is a threshold set by a user or determined by the system. Alternatively, or in addition, the system may recommend a ranked list based on level of relevancy or distance.

Developing Character Models

The character models 116-128 illustrated in FIG. 1 provide an example for a single television show. To develop character models for numerous characters spanning a large variety of media content, automated techniques, partially automated techniques, manual techniques, and their combinations are employed. Several techniques are discussed below, which may be used independently or in combination.

Semantic analysis of text may be used to develop character models. Text associated with a character is identified across different text-based media, such as Internet websites. Terms associated with the character are aggregated from the text. Semantic analysis techniques are then used to map the character onto the desired feature space. For example, a character model for Penny 106 may be developed using semantic analysis by identifying text associated with Penny 106. For example, text may be identified with a character when it is a certain number of words or less away from the character's name or image. Various terms, such as "engineer," "science," or "analytical," are aggregated from the identified text. These terms are mapped to the appropriate attribute of the character. In this case, the appropriate attribute is "scientist." In one example, each time a term maps to an attribute of the character, that character's attribute value increases by a determined amount—such as one. Similarly, when a term maps to the negative of an attribute of the character, such as "dislikes math," that character's attribute value decreases by a determined amount—such as one. In either case, the determined amount for increasing or decreasing the attribute value may be based on a strength value of the term. The term "engineer" may have a strength value of 0.25 while the term "excited" has a strength value of 1.0. Similarly, "incredibly excited" may have a strength value of 1.5. The mapping and strength values may be stored in a database for easy access when developing the character models.

Potential sources of the terms that describe the character include the character's official webpage, Wikipedia pages for the character and show the character appears in, fan pages, social networking pages, social networking chatter (e.g., tweets from Twitter, Facebook comments, etc.), and other Internet sources.

Aggregating users' responses to a character may also be used to develop character models. For example, responses related to a character's attribute may be determined as "positive" or "negative" and used to increase or decrease the attribute value in the character model accordingly. For example, users may reference a character as being "smart," which increases the attribute value for intelligence, or as "dimwitted," which decreases the attribute value for intelligence. Users' responses may be aggregated from across the Internet, such as social networks, webpages, emails, and the like. Additionally, character models may be based on explicit thumbs up and down or Likert ratings (e.g., using the Likert scale) by users, clustering user preferences for characters with other web pages the user likes and/or Internet groups of which the user is a part. These models can be additionally based on the expertise of web pages and Internet groups that mention the character, awards, trade magazines, expert commentary, and editorial reviews.

Survey methodologies may be used to develop character models. A survey can be conducted to assess a population's opinion about a character's attributes. The surveys may ask several questions to get the underlying value for a more subtle attribute. For example, to assess a "social competence" attribute, respondents may be asked if the character has a lot of friends, if the character is familiar with popular culture, and if the character is able to adapt to both formal and informal situations.

These surveys may be, for example, full-length surveys looking at each respondent's overall reaction to a character or micro-surveys asking respondents single, discrete questions using services such as Mechanical Turk or in house surveys shown along with the content being assessed.

Expert validation may be used to develop character models. Certain attributes, such as "agency" or "moral character," may benefit from input from experts in various fields including media studies and psychology. For these attributes, survey methodologies may be combined to populate the majority of the database, with expert validation on a randomly selected subset to ensure methodologies used to populate the majority of the database are in line with best practices from those fields.

User feedback may be used to develop character models. Users' responses to characters may be aggregated and used to feed into the database of character models. For example, when a consumer endorses via social networks, shares with friends, or watches a given character in a media content, the consumer is prompted to provide feedback on why they liked, shared, or viewed that particular character or media content.

Character Preference Function

Thus far, the described techniques for determining distance have not differentiated between the importance of the various character attributes as viewed from the perspective of a consumer. To be more precise, we have defined a single distance function applicable to any character. These search techniques can be further refined by taking into account whether a consumer cares more about similarity along some dimensions of the character model than other dimensions of the character model. This preference information about the consumer is captured in a character preference function and is used for determining preferences and distances between characters.

Different consumers may have different character preference functions, which are each based on the associated consumer's preferences. For example, Jessica, a television viewer, may care only about the gender of characters and the attractiveness of characters. In particular, she likes attractive characters and female characters. These preferences may be gathered directly or indirectly. For example, a user may directly input their preferences or the user's preferences may be learned by identifying which characters the user likes. As alluded to above, these user-specific preferences can be encoded in a set of "weights" for each attribute. Here, Jessica's character preference function is represented as:

$$f(\text{Jessica}) = \beta_1 \cdot c_1 + 0 \cdot c_2 + \beta_3 \cdot c_3 + 0 \cdot c_4$$

where $\beta_1$, $\beta_3$ are both greater than 0. In this example, the coefficients on the second and fourth attributes (i.e., coefficient to $c_2$ scientist attribute and coefficient to $c_4$ friendliness attribute) are 0 because Jessica does not care about them, and the coefficients on the attributes she likes (i.e., $\beta_1$ coefficient to $c_1$ gender attribute and $\beta_3$ coefficient to $c_3$ attractiveness attribute) are positive. If Jessica preferred male characters rather than female characters, the $\beta_1$ coefficient for the gender attribute would be negative. These coefficients may be referred to as the consumer's preference coefficients and they correlate to all or some of the values of the character models. The preference coefficients may be integers or real numbers. Negative preferences (e.g., a dislike for an attribute) may be incorporated into a preference function as well. One of ordinary skill in the art will appreciate that coefficients are a type of parameter, and that more generalized parameters for other functional forms may be used instead of coefficients in a linear function.

In another example, George, another television viewer, is interested only in the scientist dimension of characters. George likes scientists regardless of their other attributes. George's character preference function is significantly simpler than Jessica's character preference function because George only cares about one dimension—the scientist dimension. Thus, the coefficients, or weights, on all the other dimensions are 0. George's character preference function is reduced to:

$$f(\text{george}) = \beta_2 \cdot c_2$$

where $\beta_2$ is greater than 0. Jessica's and George's preferences are captured in their character preference functions. These character preference functions can be used to recommend characters and to determine distances between characters, with both recommendations and distances being individualized for the consumer associated with the character preference function.

As discussed above, the system can recommend characters based on the character preference function. Using Jessica's character preference function and the character models illustrated in FIG. 1, the system will rank Penny 106 and Bernadette 112 highly. This system will recommend Penny 106 and Bernadette 112 to Jessica because Penny 106 and Bernadette 112 are ranked highly based on a combination of Penny's character model 120, Bernadette's character model 126, and Jessica's character preference function. The recommendation values that are translated into rankings can be calculated using the consumer's character preference function:

$$f(\text{consumer}, \text{character}) = \vec{\beta} \cdot \vec{c}$$

where $\beta$ represents the preference coefficients of the consumer along n attributes and c represents a character's attributes, such as from a character model, along the same n attributes. This character preference function may be computed multiple times for different characters to determine the distance between characters for the particular consumer.

Based on George's character preference function and the character models illustrated in FIG. 1, the system will rank all characters that are scientists equally highly and recommend them to George. Similar equations can be used to calculate recommendation values for George.

The character preference function may also represent different or additional information than information capturing what the consumer likes or dislikes. For example, Jessica's character preference function may represent what Jessica likes, what type of characters or content Jessica has viewed in the past, what character or content Jessica has provided feedback on, whether the feedback has been positive/negative, a combination of one or more of these elements, or the like.

The system can also determine distances between characters by using the character preference functions in combination with the character models. For example, based on Jessica's character preference function described above and the character models illustrated in FIG. 1, the system will identify Penny and Bernadette as having a relatively low distance because Penny and Bernadette share the same gender (female) and attractiveness (attractive). Recall that gender and attractiveness are the two dimensions that are relevant in Jessica's character preference function. If gender and attractiveness are the only dimensions relevant to Jessica's character preference function, the distance between Penny and Bernadette is 0. Similarly, the system will determine that Howard and Penny have a relatively high distance because Howard and Penny differ in both gender and attractiveness. In particular, Howard is a unattractive and male while Penny is attractive and female. Again, recall that Jessica's character preference function emphasizes the gender and attractiveness dimensions. Thus, Howard and Penny may be viewed by the system as opposites with respect to Jessica's character preference function because Howard and Penny differ in both gender and attractiveness.

Second Order Terms for Character Preference Functions

In some instances, the distances between characters based on character models and character preference functions may be computed using second order or higher terms. For example, a consumer may like male scientists but may dislike female scientists. Similarly, a consumer may like attractive females as well as attractive scientists. To distinguish among these combinations, second order or higher preferences need to be captured in the character preference function. With regard to second order terms, note that, for example, a preference for an attractive female character (second order) is different than a preference for both attractive characters (first order) and female characters (first order).

In one example, a consumer named Brian likes female scientist and male non-scientist characters (second order), and attractive characters (first order), and friendly characters (first order). Note that a preference for a female scientist is different than a preference for female characters and characters that are scientists. Brian's character preference is:

$$f(c) = \beta_1 \cdot c_1 + \beta_2 \cdot c_2 + \beta_3 \cdot c_3 + \beta_4 \cdot c_4 + \gamma_{1,2} \cdot c_1 \cdot c_2$$

where $\beta_1$, $\beta_2$, $\beta_3$, $\beta_4$, $\gamma_{1,2}$, $\gamma_{3,4} > 0$. The second order term captured by the positive coefficient $\gamma_{1,2}$, $\gamma_{3,4}$ provide more precise metrics for character recommendations and distances between characters with relation to Brian's preferences. Brian's character preference is described below with annotations for clarity:

$$f(c) = \beta_1 \cdot c_1[\text{gender}] + \beta_2 \cdot c_2[\text{scientist}] + \beta_3 \cdot c_3[\text{attractiveness}] + \beta_4 \cdot c_4[\text{friendliness}] + \gamma_{1,2} \cdot c_1[\text{gender}] \cdot c_2[\text{scientist}]$$

This second order of preference is captured in Brian's character preference function to provide more precise metrics for character recommendations and distances between characters with relation to Brian's preferences.

In particular, Brian's character preference function illustrates that Brian likes female scientists. This is stored in Brian's character preference function using the vector of weights $\vec{\beta}$ and the matrix of weights for the second order terms $\gamma$. Thus, when computing recommendations and distances using Brian's character preference function, the system can take Brian's second order preferences into consideration. In this example with relation to Brian's character preference function, the distance d between a first character A and a second character B is determined as follows:

$$d(A, B) = \beta \cdot \text{abs}(A - B)' + \text{abs}(A - B)' \cdot \frac{\gamma}{2} \cdot \text{abs}(A - B)$$

In some cases it may makes sense to split the character attributes into their positive and negative halves. For example, $c_{i+} = c_i$ if $c_i > 0$, and $c_{i+} = 0$ otherwise, and with $c_{i-} = c_i$ if $c_i < 0$, and $c_{i-} = 0$ otherwise. Doing this allows for more complicated second order preference. For example, if Brian liked female scientists, but didn't particularly care whether male characters were scientists or not, he could instead have a preference function:

$$f(c) = \beta_1 \cdot c_1 + \beta_2 \cdot c_2 + \beta_3 \cdot c_3 + \beta_4 \cdot c_4 + \gamma_{1+,2+} \cdot c_{1+} \cdot c_{2+}$$

One of ordinary skill will readily appreciate that additional techniques may be used to represent the character preference functions.

Preference Models

A preference model may be developed by using data from multiple character preferences function in conjunction with known attributes about the users associated with the character preference functions. A database of users is aggregated that associates users with one or more attributes and their character preference function. Using this database, a preference model can be determined for a person or a group of people.

For example, assume that 75% of users who are both female and have a degree in a science, technology, engineering, or mathematics (STEM) field have user profiles that indicate they enjoy watching female scientists in media. This is a strong indicator that other females with a degree in a STEM field will also enjoy watching female scientists in media. Thus, when a new user joins the system who provides their gender as female and education as related to STEM, the system can predict that the new user will enjoy watching female scientists without requiring direct feedback from the new user about her viewing preferences. Accordingly, the system can recommend media using the techniques described above by using the prediction that the new user enjoys watching media that includes female scientists.

Similarly, multiple character preference functions can be used to predict what characteristics a particular demographic will enjoy. For example, if a group viewing is being conducted (such as in a movie theater), statistics about the attributes of the group members can be gathered in advance. The statistics about the group's attributes can be used to identify the types of characters the group is likely to enjoy. Using the techniques described above, media can be identified that the group is likely to enjoy. The preference model can also be extended beyond media to any type of character.

Beyond relying on demographic information, user specific preference functions can be calculated in a number of different ways: 1) Direct elicitation: asking users about their preferences for specific characters, character attributes, or combinations of attributes. 2) Inference from favorite characters and shows. For example, given a set of characters that the user likes and a set that the user does not like, one could estimate the preference weights by assuming that the probability that the user "liked" a character was a sigmoid function $$\left(\text{e.g., } \frac{1}{1+\exp(-x)}\right)$$

of the user's character preference function. By finding the coefficients β, γ, that maximized the joint probability that the user likes and did not like those sets of characters, the system can calculate the user's character preference function. 3) Inference from physiological recording: In the absence of direct reporting from the consumer about their character preferences, eye-tracking, facial responses, posture mapping or any number of other types of physiological recording may be used to detect which characters demand the most attention from a consumer, and whether that attention is positive or negative. Given these physiological responses to characters, a preference model could be inferred following a similar method as that described for 2). The preference model can also be extended beyond media to any type of character.

Content Recommendation

Information about characters can be used to determine ratings and recommendations of media content and to determine distances between media content. For example, a consumer who likes attractive scientists would likely enjoy a show that employs multiple characters that are attractive scientists. The same consumer would likely not enjoy a show that primarily employs characters that are unattractive non-scientists.

Media content may be rated using a salience weighted sum of a consumer's preferences for all or some characters included in the media content. The relative salience of the character in media content can be determined multiple ways.

One method to determine salience is to base the salience on the percentage of screen time the character gets in relation to the total screen time of all characters. For a simple example, consider a comedy show that includes a doctor, an engineer, and an attorney as characters. The doctor is on screen for a total of 1,100 seconds, the engineer is on screen for a total of 1,500 seconds, and the attorney is on screen for only 600 seconds. Using this first method, the salience S of a character (Char) in relation to all the characters (AllChars) can be computed as:

$$S(Char) = \frac{ScreenTime(Char)}{ScreenTime(AllChars)}$$

In this particular example of the doctor, engineer, and attorney, the salience for each character is computed as follows:

$$S(doctor) = \frac{1{,}100}{1{,}100 + 1{,}500 + 600} = 0.34375$$

$$S(engineer) = \frac{1{,}500}{1{,}100 + 1{,}500 + 600} = 0.46875$$

$$S(attorney) = \frac{600}{1{,}100 + 1{,}500 + 600} = 0.1875$$

Another method to determine salience is to base the salience on the number of reactions detected in social media relating to a character. For example, Twitter, Facebook, Google+, Instagram, and other social networking websites may be monitored to track the number of times a character's name is mentioned, a character's image is published, a character's reference is acknowledged (e.g., liking a character's fan page on Facebook), and the like. Using this method, the relative salience of a character can be determined based on the number of times a character in a media content elicits reactions versus the number of times all characters in the media content elicit reactions. For example, this computation can be performed as:

$$S(Char) = \frac{NumberOfReactions(Char)}{NumberOfReactions(AllChars)}$$

Yet another method to determine salience is to consider the character's prevalence on the Internet in general. The prevalence can be determined a number of ways. On method is to identify the number of search results returned from a reliable search engine for the name of a character. For example, searching Google for "Bill Clinton" returns about 40,400,000 results. Searching Google for "George W. Bush" returns about 95,800,000 results. Thus, the character George W. Bush is more salient with respect to the character Bill Clinton. Using this method, the prevalence of the character on the Internet can be used to calculate salience in a similar manner as the number of on-screen minutes for characters, as described above.

Another method for gathering either general or user specific character salience is to utilize physiological responses to characters. For example, eye-tracking data may be used to assess that on average viewers spend more time looking at Sheldon, Leonard, and Penny than any other characters on The Big Bang Theory, giving these characters particularly high salience over the population. Alternatively, or in addition, the system may compute that a specific user, Jessica, spent the majority of her time looking at Penny, indicating that Penny was the most salient character to her. An additional way to gather user specific salience is by analyzing a user's behavior on social media in response to watching a show.

One of ordinary skill in the art will readily recognize that not all characters of the media content must be considered for the salience techniques described above. For example, a minimum threshold value may be set so that insignificant characters (e.g., those who receive very little screen time, those who elicit very few social media reactions, those who have low prevalence on the Internet, and the like) are not considered in the salience calculations. Alternatively, or in addition, a maximum threshold may also be set so that characters in a particular media content that are very popular do not overshadow other characters in the salience calculations.

The consumers' preferences, the characters' attributes, and the characters' salience are considered for calculating a rating for a media content. This rating can then be used to rank various media content and recommend media content to consumers. Consider a consumer named Steven who is interested in viewing more females in television shows. Steven has indicated, or it has been inferred from his revealed preferences, that he would particularly like to see female scientists and that he prefers scientists in the television shows that he watches to be attractive. The system computes a character preference function for each character with relation to Steven's preferences to account for these attributes. The character preference function represents a consumer's rating of the character. To compute the character preference functions, the salience of the characters is used.

In this case, the salience for each character is pre-computed and identified in Table 1, below, with relation to the characters identified in FIG. 1. The salience values in this case were calculated based on screen time for each character using a particular episode of the show The Big Bang Theory. As discussed above, other methods may be used. Additionally, the calculation may be based on a single scene of a media content, a single episode of a media content, a single season of a media content, or all the available shows of a media content.

TABLE 1

Exemplary Salience Values

| Character | Salience |
|---|---|
| Sheldon | 0.2 |
| Leonard | 0.2 |
| Penny | 0.2 |
| Howard | 0.15 |
| Rajesh | 0.15 |
| Bernadette | 0.05 |
| Amy | 0.05 |

Let $c \in \mathbb{R}^n$ represent the attribute values for a character char on N distinct dimensions. The following character preference function is used to calculate a rating for each character:

$$f(Char) = \sum_{i=1}^{N} \beta_i \cdot c_i + \sum_{i,j} \beta_{i+,j+} \cdot c_{i+} \cdot c_{j+} + \sum_{i,j} \beta_{i-,j-} \cdot c_{i-} \cdot c_{j-} + \sum_{i,j} \beta_{i+,j-} \cdot c_{i+} \cdot c_{j-} + \sum_{i,j} \beta_{i-,j+} \cdot c_{i-} \cdot c_{j+}$$

Additionally, higher order terms may also be included. For example, the character preference function can be extended to:

$$f(Char) = \sum_{i=1}^{N} \beta_i \cdot c_i + \sum_{i,j} \beta_{i+,j+} \cdot c_{i+} \cdot c_{j+} + \sum_{i,j} \beta_{i-,j-} \cdot c_{i-} \cdot c_{j-} + \sum_{i,j} \beta_{i+,j-} \cdot c_{i+} \cdot c_{j-} + \sum_{i,j} \beta_{i-,j+} \cdot c_{i-} \cdot c_{j+}$$

higher order terms

The coefficients $\beta$ are determined separately for each user to allow for personalized recommendations. For the preferences indicated by Steven, the following character preference function is used to calculate a rating for each character:

$$f(Char) = \text{Gender} + (\text{Gender} \ast \text{Scientist}) + (\text{Attractiveness} \ast \text{Scientist})$$

Using the character models of FIG. 1 and Steven's character preference function, the ratings of the characters illustrated in FIG. 1 are computed for Steven as follows:

$f(\text{Sheldon}) = -1 + (-1 \times 1) + (-1 \times 1) = -3$ $f(\text{Leonard}) = -1 + (-1 \times 1) + (0 \times 1) = -2$ $f(\text{Penny}) = 1 + (1 \times -1) + (1 \times -1) = -1$ $f(\text{Howard}) = -1 + (-1 \times 1) + (-1 \times 1) = -3$ $f(\text{Rajesh}) = -1 + (-1 \times 1) + (0 \times 1) = -1$ $f(\text{Bernadette}) = 1 + (1 \times 1) + (1 \times 1) = 3$ $f(\text{Amy}) = 1 + (1 \times 1) + (-1 \times 1) = 1$ These calculated character ratings are valid for the characters identified for a particular episode of The Big Bang Theory. The calculated character ratings and their corresponding salience values can be used to calculate a show rating for that particular episode of The Big Bang Theory. The calculation of the show rating is performed by summing the product of each character's salience and rating. Using a salience vector $\vec{S}$ and characters rating vector $\vec{R}$, an episode rating R is calculated as:

$$R(\text{Show\_Episode}X) = \vec{S} \cdot \vec{R}$$

In this particular example of Steven with relation to the characters illustrated in FIG. 1, the rating R of The Big Bang Theory (TBBT) episode is calculated as:

$$R(\text{TBBT}) = (0.2 \times -3) + (0.2 \times -2) + (0.2 \times -1) + (0.15 \times -3) + (0.15 \times -1) + (0.05 \times 3) + (0.05 \times 1) = -1.6$$

Thus, the rating for this particular episode of The Big Bang Theory for the consumer Steven is −1.6. For recommendations, this rating value is compared to similarly calculated rating values for other shows. Rankings are prepared based on the rating values. For example, the media content with the highest rating values will be ranked highest while the media content with the lowest rating values will be ranked the lowest. The highest ranked shows are recommended to the consumer, as these highly ranked shows represent the shows that the consumer is likely to be interested in or is likely to enjoy. One of ordinary skill in the art will appreciate that coefficients are a type of parameter, and that more generalized parameters for other functional forms may be used instead of coefficients.

System Integration

The techniques discussed above may be used separately or combined to produce a powerful system for discovering and organizing characters and media content based on consumer preferences.

FIG. 2 illustrates an exemplary block diagram for a combined technique to perform discovery and organization of characters and media content. At block 202, the system accesses feedback from users. This feedback is used to determine the user's preferences and develop a character preference function. The feedback may be explicit, such as through direct questions. The feedback may be implicit, such as by analyzing webpages the user has clicked on, viewed, commented on, shared, and the like. The feedback may be physiological, such as by eye tracking, galvanic skin response, electroencephalography, facial expression tracking, posture mapping, and the like. The character preference function is stored in a database and associated with the user from whom the feedback was received.

At block 204, attributes to be included in a character model are determined. Multiple examples are described. Physical attributes of the characters may be tracked, such as gender, age, and the like. Personality attributes may be tracked, such as kindness, humor, cruelty, and the like. Social attributes or roles may be tracked, such as relationship (parent/grandparent), community leader, occupation, and the like. For shorter form content, emotional and motivational states such as excitement, anger, and/or hunger may be tracked. Additional attributes may be tracked, such as race, socioeconomic class, and the like.

At block 206, data relevant to the characters and their attributes are extracted from data sources. The data may be extracted from the text of webpages, such as Wikipedia, fan sites, social networks, such as Facebook and Twitter, surveys, expert validation, and other sources.

At block 208, character decomposition is performed. The data extracted from the data sources is used to assign values for each attribute identified in block 204 for the characters in a character model database. For example, the various techniques described above may be used to assign values for each character's character model.

At block 210, the user preference model and the character model are accessed to determine user preferences across the character attributes of the character model. The preference data is used to discover new characters or new shows that the user may like. The preference data may also be used to organize characters or shows based on the user's preferences, such as identifying which characters are similar or dissimilar. As a result, the system is able to efficiently and reliably recommend characters and media content to the user.

Figure 3:
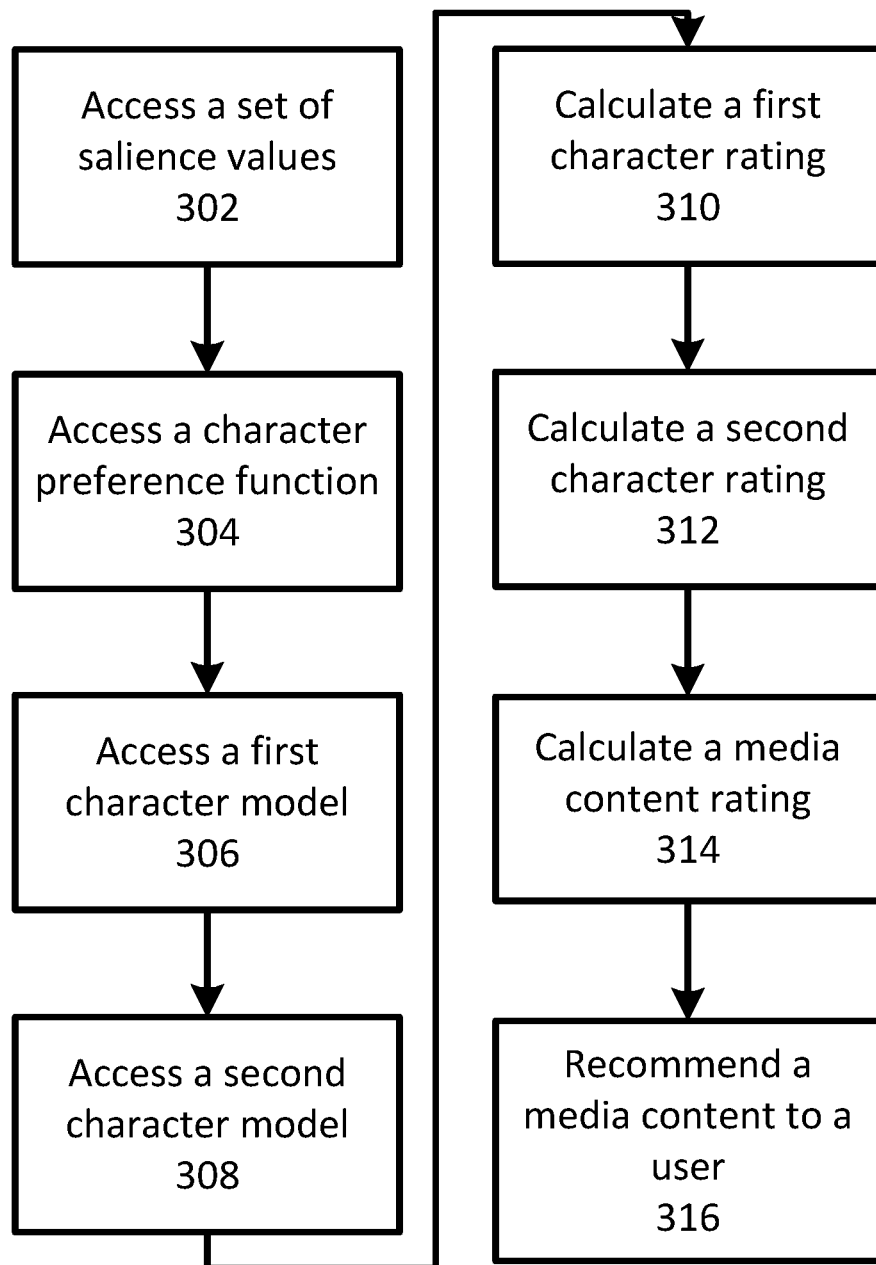
FIG. 3 illustrates an exemplary process for recommending media.

FIG. 3 illustrates an exemplary process for recommending media. At block 302, a recommendation system accesses a set of salience values. The salience values of the set are associated with a media content. Each salience value is associated with one character from the media content. The salience values are indicative of how important the characters are to the feel or tone of the show. The higher the salience value of a character, the more important the character. At block 304, the system accesses a character preference function. The character preference function is associated with a user of the system. The character preference function comprises information that identifies a plurality of preference coefficients. Each of the preference coefficients in the plurality of preference coefficients is associated with at least one attribute of interest, selected from a plurality of attributes. For example, the preference function may indicate that the user has a preference coefficient of 1 associated with a "gender" attribute of interest and a preference coefficient of 1 associated with a "scientist" attribute of interest.

At block 306, the system accesses a first character model. The first character model is associated with a first character from the media content. The first character model includes information that identifies a first set of attribute values. The attribute values are matched with attributes of the first character. The attributes may be the same as the attributes for which the character preference function includes preference coefficients. The first character is also associated with a first salience value from the set of salience values. The first salience value will be used to determine how much influence the first character has when computing a rating of the media content.

At block 308, the system accesses a second character model. The second character model is associated with a second character from the media content. The second character model includes information that identifies a second set of attribute values. The attribute values are matched with attributes of the second character. The attributes may be the same as the attributes for which the character preference function includes preference coefficients. The second character is also associated with a second salience value from the set of salience values. The second salience value will be used to determine how much influence the second character has when computing a rating of the media content.

At block 310, the system calculates a first character rating of the first character by performing a summation of the products of the plurality of preference coefficients with the first set of attribute values. For example, the system will multiply the preference coefficient for gender with the first character's attribute value for gender. The system will also multiply the preference coefficient for scientist with the first character's attribute value for scientist. These two products for gender and scientist are then added together. The first character rating of the first character is based on this summation.

At block 312, the system similarly calculates a second character rating of the second character by performing a summation of the products of the plurality of preference coefficients with the second set of attribute values. For example, the system will multiply the preference coefficient for gender with the second character's attribute value for gender. The system will also multiply the preference coefficient for scientist with the second character's attribute value for scientist. These two products for gender and scientist are then added together. The second character rating of the second character is based on this summation.

At block 314, the system calculates a media content rating. The media content rating is calculated based on the first salience value, second salience value, the first character rating, and the second character rating. The salience values are used to weight the influence that each character rating has on the media content rating.

At block 316, the system recommends the media content to the user based on the media content rating. The recommendation may be simply providing the title of the media content, providing a link to the media content, displaying the media content, and the like. For example, the media content may be an advertisement that the system has determined the user may enjoy, connect with, or sympathize with. In other examples, the media content may be a written article, a game, a mobile app or computer application, and the like.

In general, the blocks of FIG. 3 may be performed in various orders, and in some instances may be performed partially or fully in parallel. Additionally, not all blocks must be performed. For example, the set of salience values need not necessarily be accessed before accessing the first and second character models.

Figure 4:
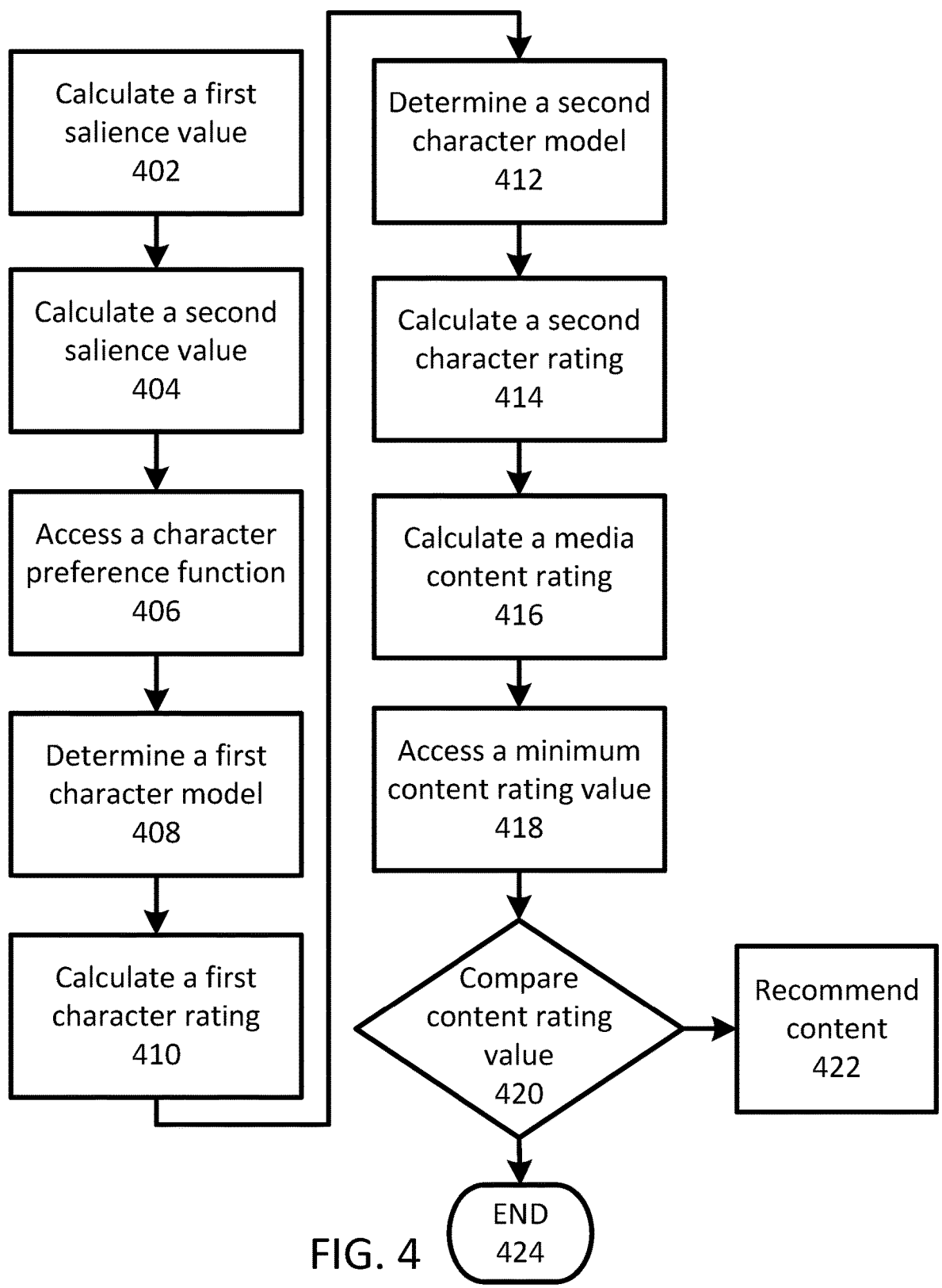
FIG. 4 illustrates another exemplary process for recommending media.

FIG. 4 illustrates an exemplary process for recommending media. At block 402, a recommendation system calculates a first salience value of a set of salience values. The first salience value is associated with a first character of a plurality of characters of a media content. The first salience value is calculated based on the on-screen time of the first character in the media content. More specifically, the system determines or accesses a total on-screen time value. For example, the total on-screen time value may be sum of the time all (or select) characters of the media content spend on screen. The system also determines or accesses the on-screen time for the first character. The first salience value is calculated by dividing the on-screen time of the first character by the total on-screen time value.

At block 404, the system calculates a second salience value of the set of salience values. The second salience value is associated with a second character of the plurality of characters of the media content. The second salience value is calculated based on the on-screen time of the second character in the media content. More specifically, the system determines or accesses the on-screen time for the second character. The second salience value is calculated by dividing the on-screen time of the second character by the total on-screen time value.

The salience values of the set are associated with the media content. Each salience value is associated with one character from the media content. The salience values are indicative of how important the characters are to the feel or tone of the show. The higher the salience value of a character, the more important the character.

At block 406, the system accesses a character preference function. The character preference function is associated with a user of the system. The character preference function comprises information that identifies a plurality of preference coefficients. Each of the preference coefficients in the plurality of preference coefficients is associated with at least one attribute of interest, selected from a plurality of attributes. For example, the preference function may indicate that the user has a preference coefficient of 0.8 associated with "female scientist" attributes of interest, a preference coefficient of 1 associated with a "female" attribute of interest, and a preference coefficient of 1 associated with a "scientist" attribute of interest.

This character preference function is a second order function. The second order function has first order terms and second order terms. The character preference function associates at least one of the plurality of preference coefficients with two or more attributes of interest of the plurality of attributes. In this example, the character preference function associates the preference coefficient of 0.8 with the attributes of interest of "female scientist."

At block 408, the system determines a first character model. The first character model is associated with the first character from the media content. The first character model includes information that identifies a first set of attribute values. The attribute values are matched with attributes of the first character. The attributes associated with the attribute values may be the same as the attributes for which the character preference function includes preference coefficients.

The first character model is determined in part by identifying textual content associated with the first character in electronic sources, such as websites, electronic books, electronic newspapers and magazines, social media, and the like. The system aggregates a plurality of attribute terms associated with the first character from the textual content. For example, the system may aggregate terms such as "cute," "smart," "social," and the like. The system maps at least some of the plurality of attribute terms to at least some of the plurality of attributes. This mapping allows a relationship to be identified between the aggregated terms (such as "cute") and the attributes of the character that are tracked (such as "attractive"). The system updates the attribute values of the first character based on the plurality of attribute terms.

At block 410, the system calculates a first character rating of the first character. The system sums the first order terms and the second order terms of the character preference function in conjunction with the first character model. For the first order terms, the system calculates the products of the plurality of preference coefficients that are first order with the first set of attribute values. In this example, the system multiplies the preference coefficient of 1 associated with "scientist" with the first character model's attribute value for "scientist." Similarly, the system multiplies the preference coefficient of 1 associated with "female" with the first character model's attribute value for "female." For the second order terms, the system determines the product of the at least one of the plurality of preference coefficients with each attribute value of the first set of attribute values of the two or more attributes of interest of the plurality of attributes. In order words, the system calculates the products of the plurality of preference coefficients that are second order with the first set of attribute values. In this example, the system multiplies the preference coefficient of 0.8 associated with "female scientist" with the first character model's attribute value for "female" and with the first character model's attribute value for "scientist." The first order terms and second order terms are then summed to produce the first character rating.

Each of the attribute terms may be associated with a strength value. This is helpful for distinguishing between strong terms and less strong terms. For example, a strong term may indicate that a character is "definitely friendly." A less strong term may indicate that the character is "sometimes friendly." The system then updates the attribute values of the first character based on the corresponding strength values of the attribute terms. In this example, "definitely friendly" may be associated with a 1.5 for the friendliness attribute, while "sometimes friendly" is associated with a 0.75 for the friendliness attribute. In one example, the system stores the updated attribute values of the first character in a database as a vector, the vector associated with the first character.

At block 412, the system determines a second character model. The second character model is associated with the second character from the media content. The second character model includes information that identifies a second set of attribute values. The attribute values are matched with attributes of the second character. The attributes associated with the attribute values may be the same as the attributes for which the character preference function includes preference coefficients.

The second character model is determined in a similar fashion as described above with respect to the first character model. The second character model is determined in part by identifying textual content associated with the second character in electronic sources. The system aggregates a plurality of attribute terms associated with the second character from the textual content. The system maps at least some of the plurality of attribute terms to at least some of the plurality of attributes. The system updates the attribute values of the first character based on the plurality of attribute terms and the corresponding strength values of the attribute terms. In one example, the system stores the updated attribute values of the second character in a database as a vector, the vector associated with the second character.

At block 414, the system calculates a second character rating of the second character. The second character rating is computed in a similar fashion as the first character rating. However, the second character model and second character attribute values are used. At block 416, the system calculates a second character rating of the second character in a similar fashion as calculated for the first character.

At block 416, the system calculates a media content rating. The media content rating is calculated based on the first salience value, second salience value, the first character rating, and the second character rating. The salience values are used to weight the influence that each character rating has on the media content rating.

At block 418, the system accesses a minimum content rating value. At block 420, the system compares the media content rating to the minimum content rating value. The media content rating is numerical and the minimum content rating value is numerical. If the media content rating is greater than the minimum content rating value, the system moves to block 422. Otherwise, the process ends at block 424.

At block 422, the system recommends the media content to the user based on the media content rating. The recommendation may be simply providing the title of the media content, providing a link to the media content, displaying the media content, and the like. For example, the media content may be an advertisement that the system has determined the user may enjoy, connect with, or sympathize with. In other examples, the media content may be a written article, a game, a mobile app or computer application, and the like.

In general, the blocks of FIG. 4 may be performed in various orders, and in some instances may be performed partially or fully in parallel. Additionally, not all blocks must be performed. For example, the first character rating and the second character rating may be computed in parallel.

While FIG. 4 is described with respect to recommending media to a user, the techniques described above may be applied to various other systems. In one example, the system may be used to provide an interface to filter and curate information based on character decomposition. More specifically, the system may be used to: alter rankings for a list of items, control viewing abilities of a television or other viewing system, suggest content for purchasing, recommend video games or prevent access to video games, filter content to prevent children from viewing content with a negative message, characterize what a child is watching, or find the intersection between the desires of a parent and the viewing preferences of a child.

In another example, the system may provide information to content producers to understand audience preferences based on character decomposition, such as through use of character-based analytics. More specifically, the system may be used to: aggregate insights to content producers on what types of characters to create based on aggregated user demand or preferences, or identify characteristics/attributes of a character most likely to resonate with a particular target user group to enable mapping of a character/celebrity with a target audience.

In another example, the system may provide complementary, simultaneous, character-based browsing and information discovery. More specifically, the system may be used to: provide a second screen experience, enhance viewing experience of media with simultaneous recommendations, and provide in-play ads based on characters appearing in the show.

In yet another example, the system may be used for user-generated character creation. Users can create their own characters based on what features the user likes. This allows for the collection of user-generated signals and data that informs the development of characters based on attributes the user (or users) value most. This also generates insights on user preferences and latent demand for specific types of characters as well as explicitly informing and directing new character development for content providers.

Character-Based Analytics

Turning now to details and examples pertaining to character-based analytics for media content, a technique is described that provides organization, indexing, and retrieval of character-level information about media content. Character-level information may also be used for analytics, where outcome measures may include one or both of measurable/computed events (e.g., viewing times, click-throughs, shares, or completions) and elicited measures from a user (e.g., star ratings on a video, or answers to survey questions such as attitude toward a brand, emotional responses to the video), in some instances these may include the long term effects of media (for example, the potential effects of exposure to some media on self-esteem). One example of an elicited emotional outcome measure is rankings (e.g., on a scale from 1-7) or data received in response to questions such as "Did you like the content?", "Did the content make you angry?", and "Did the content make you outraged?"

In one embodiment, the technique provides the ability to index media, such as videos and images used for entertainment or advertising, according to the attributes of the characters contained within the media (e.g., using character models). For example, a set of media may be used for user entertainment (e.g., movies), advertising purposes (e.g., advertisements), or both. For one or more media in the in the set of media (or for each media in the set of media), the system performs one or more of the following: (a) index the characters, either by name or another identifier (e.g., identify how many characters there are and uniquely identify the characters), (b) index the characters on one or more objective and/or subjective attributes, such as based on the character models discussed above, (c) retrieve information (e.g., character model of a character) from the index of characters, and (d) retrieve information (e.g., a list of characters or a character model of a character) from the index of characters based on character attributes.

For example, information may be retrieved from the index of characters by performing one or more of the following: (a) identifying the identifiers for one or more (or optionally, all) characters in a media, (b) accessing the values for one or more attributes of each the one or more characters in the media, (c) aggregating the attributes and/or values for the one or more attributes over a plurality of the one or more characters in the media to obtain attribute-level values for each (or at least one) of the one or more attributes using any of the following exemplary capture functions: (1) maximum attribute value over all characters (e.g., how attractive is the most attractive character in the media, how intelligent is the most intelligent character in the media), (2) maximum attribute value over all characters within a demographic category (e.g. how attractive is the most attractive male in the media, how intelligent is the most intelligent Latina in the media), (3) average attribute value over characters within a demographic category (e.g., what is the average attractiveness of male characters in the media, what is the average intelligence of Latino women in the media), and/or (4) a salience weighted average value (e.g., what is the weighted average attractiveness of male characters in the media, with the salience and weights being specified as described above).

For another example of retrieving items from the index of characters based on character attributes, all items are retrieved from the index of characters for characters that are: "confident AND female" or "black AND young AND male".

In another embodiment, a technique provides the ability to analyze how attributes of characters within media content correspond to outcome measures. Outcome measures may be either predetermined, computed, or elicited as described above.

One example of a computed outcome measure includes calculating the number (or rate) of user interactions (e.g., web site click-through, playback completion, exceeding a viewing duration) with a media content (e.g., advertisement). The user interaction (e.g., outcome measure information) may be a click-through or a click-through rate by one or more users on a webpage or other interactive user interface. The click-through rate may be an aggregate or may be specific to a particular demographic. In other examples, the user interaction may be a viewing time of the media content (e.g., video, webpage, or image), such as an advertisement. In another example, the user interaction may be based on a determination of whether a timed media (such as a video) is watched, listened to, played back, or perceived by a user to completion (or for at least a threshold period of time). This interaction (e.g., outcome measure information)

may be recorded as a binary variable specifying whether the user interaction with the media lasted until completion of the playback of the media content. Similarly, the interaction (e.g., outcome measure information) may be recorded as a binary variable specifying whether the user interaction with the media lasted for at least a threshold period of time. The threshold period of time may be, for example, 15 seconds, 20 seconds, 25 seconds, or 30 seconds. Exceeding one or more of these threshold periods of time for interaction by a user indicates the user's interest in the media. The user interaction may also be a measure of time the user spends interacting (e.g., listening, watching) with the media content. Thus, the measure of time for interaction may be in seconds, minutes, hours, or the like. Another example of a computed outcome measure includes calculating the number (or rate) of postings (e.g., outcome measure information) to social media.

In some examples, computed outputs may be computed based on the use of a website browser cookie, may be computed and provided by a third party, or may be combination of the two. For example, the technique may monitor media interactions (such as views) by users, but receive demographic information of those users from a system of a third-party provider. Accordingly, in this example, calculating the views by members of a particular demographic is based on a combination of monitoring user interactions with media and demographic data provided by the system of the third-party provider. In other examples, a single system computes (e.g., calculates, measures, or determines) both the media interactions and the user demographic information.

In one exemplary predictive analytics embodiment, a car company has five different Internet video advertisements in circulation for a new car. For example, the advertisements are being displayed to Internet users of a forum website. Each of the five video advertisements features one or more different respective spokespersons (e.g., one or more characters) who convey information about the new car to the viewer of the advertisement, such as through a sales pitch explaining the benefits of the car. The car company wants to measure the relative effectiveness of each of the five video advertisements (or the effectiveness of each spokesperson) with a specific demographic (e.g., a demographic of interest: young men, such as men between the ages of 18-35). The system collects outcome measure information (e.g., user's interaction with content), such as completion rates, for the advertisements for a large sample of users (e.g., between 1,000-2,000 users). The system also collects demographics information for the sample of users. For example, the system may collect and store information that relates a particular user's viewing session, and therefore advertisement interaction information, with the demographics information of the user. For example, the demographics information of the user may have been received and stored by the system at the time the user registered for an account with the forum website. In some embodiments, the identity of the user optionally remains anonymous to the system. The system then uses the demographics information (e.g., accesses demographics information of a plurality of users to identify a subset of the plurality of users) and the interaction information to determine which attributes of the spokespersons (e.g., a character in a media) are most effective (e.g., result in high completion rates) for that specific demographic (e.g., the demographic of interest: men between the ages of 18-35).

In one example of this determination, the system accesses character models for one or more (or for each) character of one or more (or each) of the five advertisements. For each respective advertisement, the system identifies a value of the confidence attribute of the most confident female character (e.g., assume 0 if there is no female character), a value of the confidence attribute of the most confident male character (e.g., assume 0 if there is no male character), a value of the attractiveness attribute of the most attractive female character (e.g., assume 0 if there is no female character), and a value of the attractiveness attribute of the most attractive male character (e.g., assume 0 if there is no male character) in the respective advertisement. This technique illustrates the above-described capture function using a maximum value of a character attribute within a demographic of characters.

This yields four potential predictor variables for the outcome measures of interest: (1) confidence of the female character, (2) confidence of the male character, (3) attractiveness of the female character, and (4) attractiveness of the male character. Exemplary data for the five advertisements with respect to the predictor variables is illustrated in table 600 of FIG. 6.

Table 600 illustrates values for different attributes of characters for each of the five advertisements, where each row of table 600 is for one of the five advertisements. In this example, column 602 represents a value of the confidence attribute of the most confident female character. Thus, if advertisement 1 includes two female characters, a first female character with a confidence value of 6 and a second female character with a confidence value of 8, the system will identify the highest confidence value of the two female characters (i.e., 8), as illustrated in cell 602A. A similar technique is followed for the other 4 advertisements and for each of the other three attributes, as illustrated in rows 604, 606, and 608. For example, the attribute values of the characters may be on a scale from 0 to 10.

Alternatively, or in addition, capture functions other than identifying a maximum within a demographic may be used for determining the values of attributes for the media (e.g., the five advertisements), as described above. For example, other functions include: maximum attribute value over all characters, average attribute value over all characters, and a salience weighted average value for characters.

The system also calculates an outcome measure based on the interaction information. In this example, the interaction information includes whether an advertisement was viewed to completion (e.g., did the user watch the entire video advertisement or stop/end the video advertisement prior to completion) and the outcome measure is based on the rate of whether the advertisement was viewed to completion. The outcome measure may be limited to the specific demographic (e.g., the demographic of interest: men between the ages of 18-35). Exemplary computed outcome measures for the five advertisements are illustrated in table 650 of FIG. 6.

Table 650 illustrates completion rates for each of the five advertisements, where each row of table 650 is for one of the five advertisements. In this example, column 652 represents the rate of completion for each of the five advertisements, where a value of 1 implies every user of the specific demographic watched the advertisement to completion and 0 implies no user of the specific demographic watched the advertisement to completion. Thus, cell 652A illustrates that approximately 1.2% of the specific demographic (e.g., the demographic of interest: men between the ages of 18-35) watched advertisement 1 to completion.

The system uses the information of table 600 and table 650 to perform a regression. Regression analysis generally generates an equation to describe the statistical relationship between the one or more predictor variables and the response variable. The regression may be, for example, a linear regression (e.g., where the dependent variable is continuous) or a logistic regression (e.g., where the dependent variable is discrete or categorical). The regression coefficients generally represent the mean change in the response variable for one unit of change in the predictor variable, while holding other predictors in the model constant. Accordingly, the regression helps to isolate the role of one predictor variable from all of the other predictor variables in the model.

In this example, performing the regression determines that for the specific demographic (e.g., the demographic of interest: men between the ages of 18-35), the significant coefficients for watching advertisements to completion are on "Confidence of female" (e.g., column 604 of table 600) and "Attractiveness of Male" (e.g., column 608 of table 600) attributes. For example, the system may use a threshold value for the statistical significance level or absolute value of coefficients to determine which attributes are significant. Similarly, performing the regression determines that the "Attractiveness of Female" and "Confidence of Male" attributes are not significant predictors of the specific demographic (e.g., the demographic of interest: men between the ages of 18-35) watching advertisements to completion. This significance information may be stored in the system (or remotely) for subsequent retrieval.

Based on this calculated information and determination, the advertiser can choose to target advertisements with confident female characters and/or attractive male characters to the specific demographic (e.g., the demographic of interest: men between the ages of 18-35). For example, the system can determine demographic information for a new user of the forum website, and select an advertisement for display from among a plurality of advertisements, wherein the advertisement for display is selected based on the demographic information of the new user and the stored (or calculated) significance information. Accordingly, the system may display advertisement 2 or 4. The system may select advertisement 2 or 4 by determining which advertisements exceed a minimum threshold value for one or both of the attributes of significance. In this example, the minimum threshold value may be 5 for both "Confidence of Female" and "Attractiveness of Male". Thus, advertisements 2 and 4 meet the minimum threshold value. In some examples, a first attribute of significance is assigned a first minimum threshold value and a second attribute of significance is assigned a second minimum threshold value, where the first and second minimum threshold values are different. Similarly, additional attributes determined to be significant may be assigned different corresponding minimum threshold values for selection of the advertisement for display.

Figure 7:
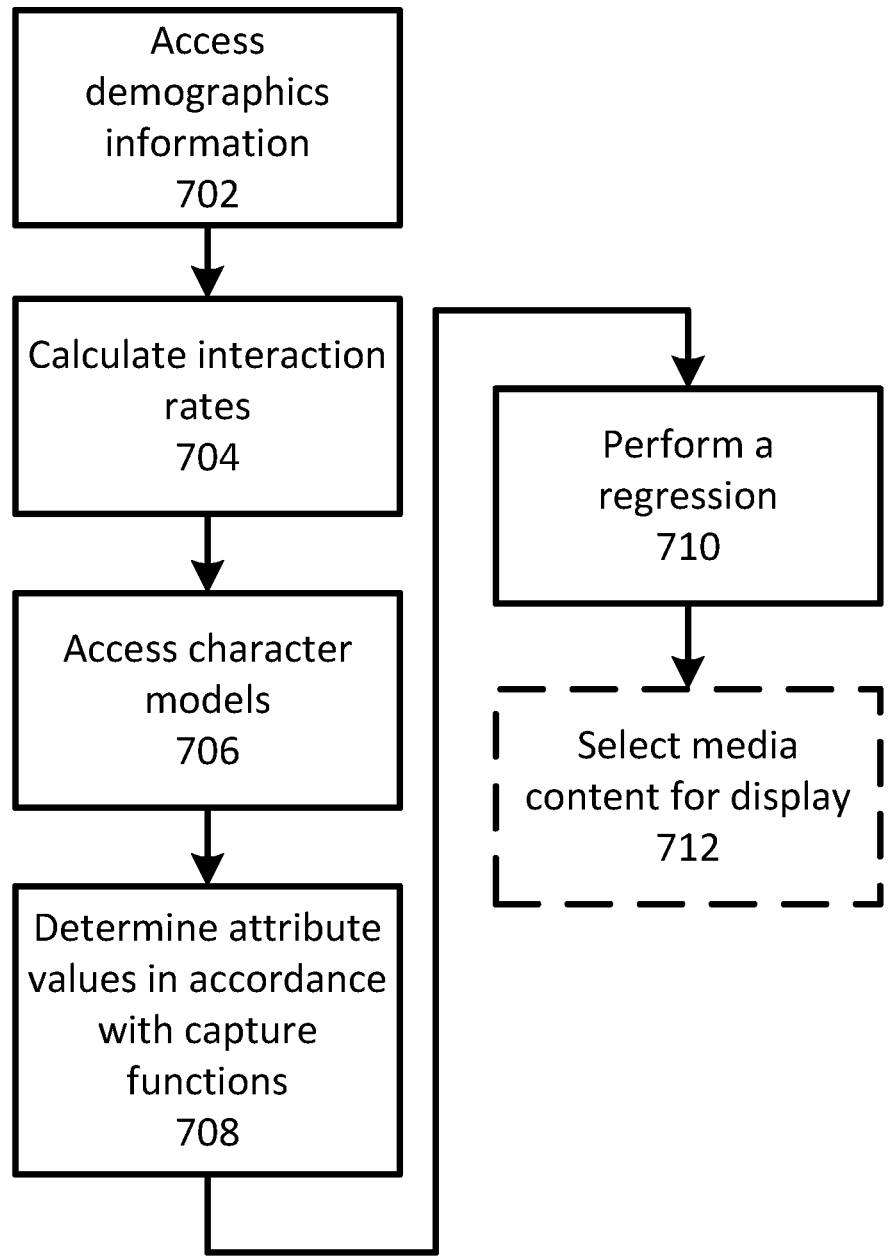
FIG. 7 illustrates an exemplary process for generating and using character-based insights and selecting media content for display.

FIG. 7 illustrates an exemplary process for selecting media content for display. At block 702, a system accesses demographics information of a plurality of users to identify a subset of the plurality of users and outcome measure information of the subset of the plurality of users, the outcome measure information and other potential outcome measures relating to a plurality of media content, the plurality of media content comprising a first media content and a second media content.

At block 704, the system calculates a first outcome measure (or set of outcome measures) for the first media content, the first outcome measure based on the outcome measure information, and a second outcome measure (or set of outcome measures) for the second media content, the second outcome measure based on the outcome measure information.

At block 706, the system accesses respective character models of one or more characters depicted in the first media content and respective character models of one or more characters depicted in the second media content.

At block 708, the system determines, for the first media content, a first attribute value of a first attribute of the one or more characters depicted in the first media content, the determination based on the respective character models and in accordance with a first capture function, and a second attribute value of a second attribute of the one or more characters depicted in the first media content, the determination based on the respective character models and in accordance with a second capture function. The system also determines, for the second media content, a third attribute value of the first attribute of the one or more characters depicted in the second media content, the determination based on the respective character models and in accordance with the capture function, and a fourth attribute value of the second attribute of the one or more characters depicted in the second media content, the determination based on the respective character models and in accordance with the capture function.

At block 710, the system performs a regression using the first attribute value, the second attribute value, the third attribute value, the fourth attribute value, the first outcome measure (or set of outcome measures), and the second outcome measure (or set of outcome measures) to determine at least one attribute of significance.

In some embodiments, the at least one attribute of significance is determined based on a value of the at least one attribute of significance exceeding a threshold significance value. In some embodiments, the outcome measure information comprises video playback completion data for the first media content and the second media content and wherein the first attribute is different from the second attribute.

In some embodiments, the outcome measure information comprises minimum duration of video playback data for the first media content and the second media content. In some embodiments, the determined attribute of significance is one of the first attribute and the second attribute.

In some embodiments, the outcome measure information comprises an elicited measure of the user's emotional response to the first media content and the second media content.

In some embodiments, the plurality of media content further comprises a third media content. The system calculates a third outcome measure (or set of outcome measures) for the third media content, the third outcome measure based on the outcome measure information, and accesses respective character models of one or more characters depicted in the third media content. The system determines, for the third media content, a fifth attribute value of the first attribute of the one or more characters depicted in the third media content, the determination based on the respective character models and in accordance with the first capture function, and a sixth attribute value of the second attribute of the one or more characters depicted in the third media content, the determination based on the respective character models and in accordance with the second capture function. Performing the regression to determine the at least one attribute of significance further comprises using the fifth attribute value and the sixth attribute value.

At block 712, in some embodiments, the system selects media content for display, the media selected based on depicting a character having at least a threshold value of the at least one attribute of significance. Alternatively, or in addition, the system may compose and/or display an analytics dashboard. The analytics dashboard may optionally include one or more of: the outcome measures (or set of outcome measures) described above, statistics (and/or images) based on the outcome measures described above, one or more of the attributes of significance described above, statistics (and/or images) based on the attribute(s) of significance described above, the attribute values, images based on the attribute values, the capture functions, further descriptive analytics described below, data visualizations or presentations of the preceding, and other insights generated as a result of the analysis.

In some embodiments, the system may determine which attributes are predictive of particular outcomes and the degree to which the attributes are predictive of the particular outcomes. The system may select a subset of the attributes for display based on the subset of the attributes being significant predictors of the particular outcomes. The system may display the selected subset of attributes and the degree to which the attributes are predictive of the particular outcome.

In some embodiments, the system selects (and/or displays) attributes of interest that are significant predictors of the outcome measure.

Descriptive analytics examples are now described. Consider an advertising platform or policy-maker seeking to understand whether women (e.g., a first value for an attribute of interest: female) and men (e.g., a second attribute for the attribute of interest: male) are portrayed differently in advertisements (or media, generally) for a particular company or for a particular industry.

The system performs the following analysis to determine whether (or to what degree) characters of the advertisements are portrayed equally for a set of relevant attributes. The system retrieves character models for male characters and female characters of the advertisements. The system computes the total number of female characters and the total number of male characters in the advertisements. The system also computes and compares the average values for one or more of the set of relevant attributes (e.g., intelligence, confidence, and attractiveness).

If the system determines significant differences (e.g., exceeding a determined threshold) in the number of males or females representation or in one or more of the relevant attributes (e.g., these may include important motivations such as the desire for leadership), the system may generate a notification, such as for display in the advertising platform or for notification of the policy maker. This may, for example, prompt the policy-maker to encourage or require the industry to include more characters of the under-represented gender in advertisements or make an effort to portray characters of both genders more equally on at least one of the set of relevant attributes. Continuing this example, the analysis may show that female characters are not only shown less, but are shown to have significant less desire for leadership. A policy maker may subsequently create a set of recommendations or guidelines to increase the number of female characters shown in leadership roles and as desiring leadership.

The system may also perform this type of descriptive analytics analysis on advertisements targeted at a specific demographic (e.g., young women), on advertisements in a particular industry, or on advertisements targeted to a particular demographic.

In one embodiment, character models may be used to analyze character driven engagement (e.g., interaction) with media. Specifically the system relies on character attributes as the basis for analyzing and predicting user engagement, where engagement may be one or more of (1) viewership of a tv show or movie (e.g. Nielsen Rating, box office draws, or more direct measures such as views on a particular streaming video website), (2) social media engagement with either the media (e.g., tv show) in general or a particular character in a media, such as by including comments about the show or character, and "likes," "votes," or other lightweight actions pertaining to the show or character, and (3) deeper engagement with the character or show including generating user content (e.g., fan fiction, video tributes, and parodies) pertaining to a tv show or movie. These engagement measures can either be general over the entire viewing public or restricted to specific demographic or psychographic groups (e.g. men ages 18-35 or "millennial women").

Predictors of engagement can be determined using character models. The system determines a dependent variable of interest (e.g. comments on social media about each character of interest, number of video tributes to each of these characters, or number of fan fiction stories centered around each of these characters). The dependent variable of interest is the measure of engagement: y, where $y_i$ is the measured engagement level for the $i^{th}$ character.

The system constructs dependent variables of interest using the character models. In one example, the dependent variables of interest includes the character model itself (e.g. the character's attribute values on one or more attributes), or can be expanded to include higher order interaction terms (e.g. (gender==female)*leadership, or (gender==male)* (race==Asian)*confident). These dependent variables may be represented in a matrix X, where the elements $x_{ij}$ represent the value the $i^{th}$ character on the $j^{th}$ dependent variable.

The system estimates the parameters, β of a function F(X, β)=y. In one example, F(X, β)=X·β. In another example, F(X, β) is equal to any transformation of g(X·β), where g is a monotonic function on $\mathbb{R}$ (e.g. $g(x)=\sqrt{x}$, or $$g(x) = \frac{e^x}{1 + e^x}).$$

The system determines the predictors of engagement using the parameters β.

In one embodiment, character models may be used to determine predictors of engagement for media (e.g., a tv show, movie, or advertisement). A dependent variable of interest is identified, as described above. The variable of interest may be based on characteristic of media, rather than an attribute of a character (e.g. viewership of a show or movie as measured by Nielsen or Box Office draw, comments on social media bout the content, or user-generated content about the media content. The dependent variable is the measure of engagement: y, where $y_i$ is the measured engagement level for $i^{th}$ piece of content.

The system constructs independent variables of interest using the character models for one or more characters in each media (e.g., tv show). This can be done several ways. In one example, the system calculates a salience weighted mean value of an attribute of one or more characters in the show (e.g., the average intelligence of characters in the show). Note that for categorical features such as race or gender this will yield the proportion of characters with that attribute (e.g. the proportion of female characters or the proportion of white characters). In another example, the system calculates the maximum or minimum of one or more attributes of one or more characters in the show (e.g., how smart is the smartest character on the show, or how dumb is the dumbest character on the show). In another example, the system calculates using an aggregate of character attributes using mean, salience weighted mean, maximum or minimum (e.g., how intelligent is the smartest woman on the show, or what is the mean intelligence of women on the show). These content-level independent variables can be stored in a matrix X, where the elements $x_{ij}$ represent the value the $i^{th}$ show on the $j^{th}$ independent variable.

The system calculates (e.g., estimates) the parameters β of a function F(X, β)=y. In one example, F(X, β)=X·β. In another example, F(X, β) equals any transformation of g(X·β), where g is a monotonic function on ℝ (e.g., g(x)=$\sqrt{x}$, or $$g(x) = \frac{e^x}{1+e^x}.$$

The system determines the predictors of engagement based on the parameters β.

Figure 8:
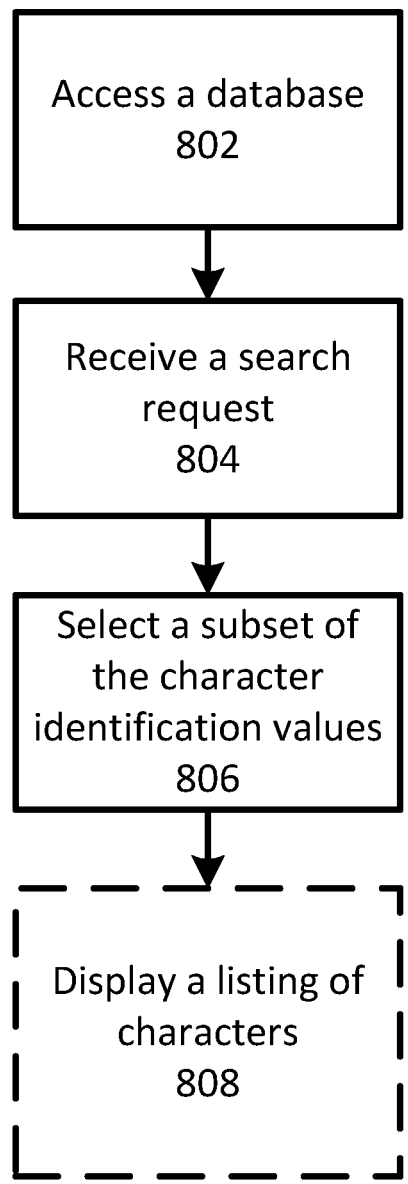
FIG. 8 illustrates an exemplary process in accordance with some embodiments.

One example of vector-based searching to identify characters or media content is now described. In FIG. 8, at block 802, the system accesses a database, the database including a plurality of character identification values associated with a plurality of character models, the plurality of character models comprising a set of attribute values for a plurality of attributes.

At block 804, the system receives a search request, the search request comprising a first attribute search threshold value associated with a first attribute of the plurality of attributes and a second attribute search threshold value associated with a second attribute of the plurality of attributes.

At block 806, the system selects a subset of the character identification values based on character models associated with the subset of the character identification values meeting the first attribute search threshold value for the first attribute and meeting the second attribute search threshold value for the second threshold.

In some embodiments, at block 808, the system displays a listing of characters identified by the subset of the character identification values.

In some embodiments, determines plurality of media content based on the plurality of media content including one or more of the characters identified by the subset of the character identification values. The system displays a listing of the plurality of media content.

In some embodiments, the system alters rankings of a list of media content based on the selected subset of character identification values.

In some embodiments, prevents a display device from displaying content on the selected subset of character identification values.

In some embodiments, recommends media content for purchase based on the selected subset of character identification values.

Figure 5:
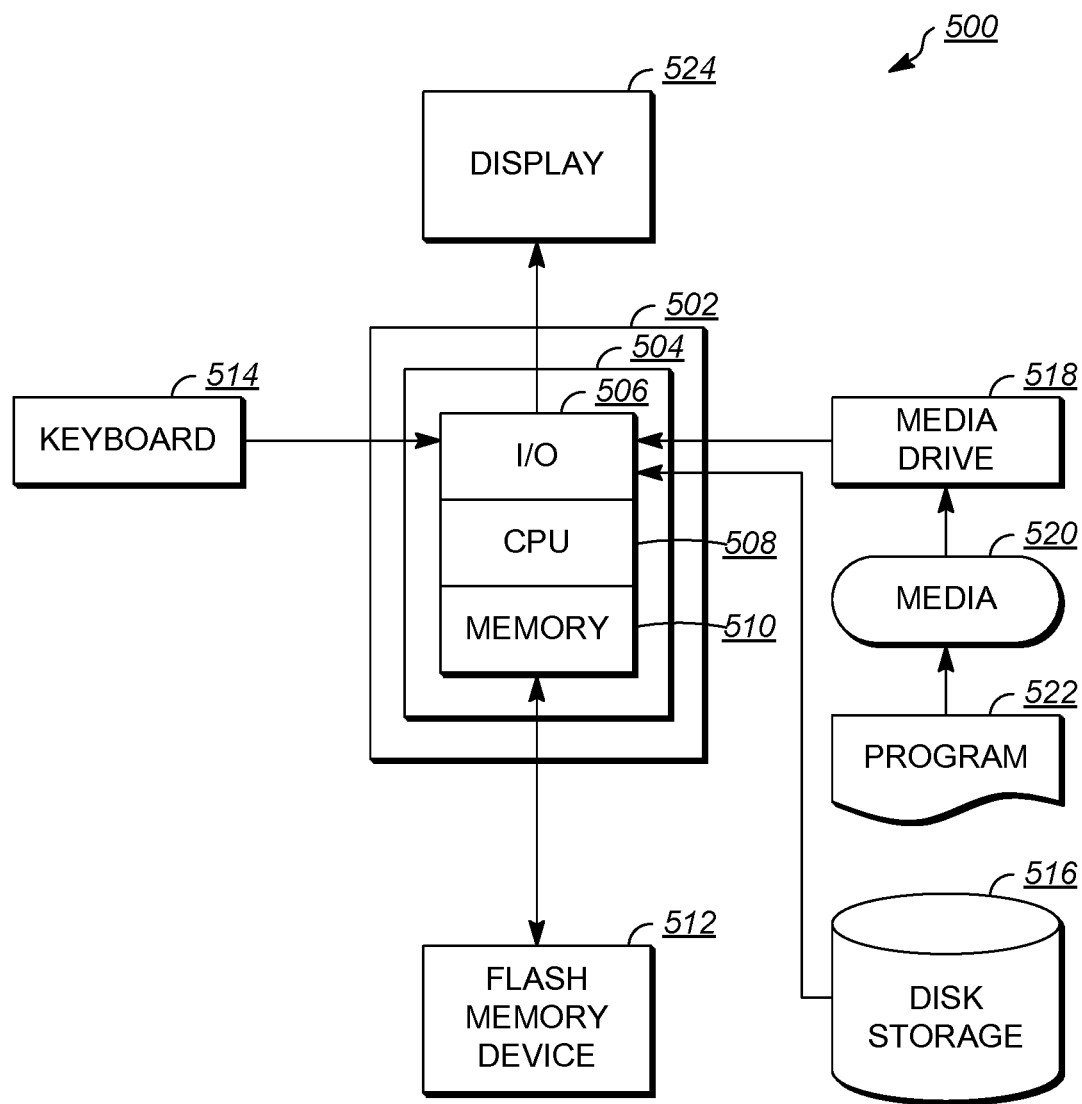
FIG. 5 illustrates an exemplary computing system.

FIG. 5 depicts an exemplary computing system 500 configured to perform any one of the above-described processes. In this context, computing system 500 may include, for example, a processor, memory, storage, and input/output devices (e.g., monitor, keyboard, touch screen, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform the above-described processes. The main system 502 includes a motherboard 504 having an input/output ("I/O") section 506, one or more central processing units ("CPU") 508, and a memory section 510, which may have a flash memory device 512 related to it. The I/O section 506 is connected to a display 524, a keyboard 514, a disk storage unit 516, and a media drive unit 518. The media drive unit 518 can read/write a computer-readable medium 520, which can contain programs 522 and/or data. The I/O section 506 may also connect to cloud storage using, for example, cellular data communications or wireless local area network communications.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Perl, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of these techniques. For example, aspects of embodiments disclosed above can be combined in other combinations to form additional embodiments. Similarly, aspects of embodiments disclosed above can be excluded. Accordingly, all such modifications are intended to be included within the scope of this disclosure.

What is claimed is:

1. A computer-implemented method for analyzing a plurality of media content, the method comprising:
  accessing respective character models of multiple female characters represented in the plurality of media content from an indexed table of a database;
  determining, based on the respective character models of the multiple female characters, respective female attribute values of an attribute for the multiple female characters;
  determining, based on the respective female attribute values, an overall female attribute value, wherein the overall female attribute value is an average of the respective female attribute values;
  accessing respective character models of multiple male characters represented in the plurality of media content from the indexed table of the database;
  determining, based on the respective character models of the multiple male characters, respective male attribute values of the attribute for the multiple male characters;
  determining, based on the respective male attribute values, an overall male attribute value, wherein the overall male attribute value is an average of the respective male attribute values;
  comparing the overall female attribute value with the the overall male attribute value, wherein comparing the overall female attribute value with the overall male attribute value comprises determining whether a difference between the overall female attribute value and the overall male attribute value satisfies a threshold; and based on a result of the comparing, providing a notification for display, wherein the notification includes a prompt encouraging a user to decrease the difference between the overall female attribute value and the overall male attribute value.

2. The computer-implemented method of claim 1, further comprising accessing salience values for the multiple female characters and salience values for the multiple male characters, wherein the average of the respective female attribute values is a salience-weighted average of the respective female attribute values that is based on the salience values for the multiple female characters, and wherein the average of the respective male attribute values is a salience-weighted average of the respective male attribute values that is based on the salience values for the multiple male characters.

3. The computer-implemented method of claim 1, wherein providing the notification for display based on a result of the comparing comprises providing the notification for display based on the difference satisfying the threshold.

4. The computer-implemented method of claim 1, wherein the notification includes an indication of whether the overall female attribute value or the overall male attribute value is greater and an indication of the attribute.

5. The computer-implemented method of claim 1, wherein the attribute refers to a character quality, and wherein the character quality is a career, a demographic, a location, a social trait, a physical trait, or an intellectual trait.

6. The computer-implemented method of claim 5, wherein the attribute is represented in a binary space.

7. The computer-implemented method of claim 5, wherein the attribute is represented in a continuous space.

8. The computer-implemented method of claim 5, wherein the attribute is one of a plurality of attributes, wherein the respective character models of the multiple female characters and the respective character models of the multiple male characters comprise respective multidimensional representations of the plurality of attributes.

9. The computer-implemented method of claim 1, wherein the plurality of media content is a plurality of advertisements for a company.

10. The computer-implemented method of claim 1, wherein the plurality of media content is a plurality of advertisements for an industry.

11. A non-transitory computer-readable medium having stored therein instructions that upon execution by a processor, cause performance of a set of acts comprising:

accessing respective character models of multiple female characters represented in a plurality of media content from an indexed table of a database;

determining, based on the respective character models of the multiple female characters, respective female attribute values of an attribute for the multiple female characters;

determining, based on the respective female attribute values, an overall female attribute value, wherein the overall female attribute value is an average of the respective female attribute values;

accessing respective character models of multiple male characters represented in the plurality of media content from the indexed table of the database;

determining, based on the respective character models of the multiple male characters, respective male attribute values of the attribute for the multiple male characters;

determining, based on the respective male attribute values, an overall male attribute value, wherein the overall male attribute value is an average of the respective male attribute values;

comparing the overall female attribute value with the overall male attribute value, wherein comparing the overall female attribute value with the overall male attribute value comprises determining whether a difference between the overall female attribute value and the overall male attribute value satisfies a threshold; and based on a result of the comparing, providing a notification for display, wherein the notification includes a prompt encouraging a user to decrease the difference between the overall female attribute value and the overall male attribute value.

12. The non-transitory computer-readable medium of claim 11, wherein the attribute is intelligence.

13. A computing system comprising:

a processor; and a non-transitory computer-readable storage medium, having stored thereon program instructions that, upon execution by the processor, cause performance of a set of operations comprising:

accessing respective character models of multiple female characters represented in a plurality of media content from an indexed table of a database, determining, based on the respective character models of the multiple female characters, respective female attribute values of an attribute for the multiple female characters, determining, based on the respective female attribute values, an overall female attribute value, wherein the overall female attribute value is an average of the respective female attribute values, accessing respective character models of multiple male characters represented in the plurality of media content from the indexed table of the database, determining, based on the respective character models of the multiple male characters, respective male attribute values of the attribute for the multiple male characters, determining, based on the respective male attribute values, an overall male attribute value, wherein the overall female attribute value is an average of the respective female attribute values, comparing the overall female attribute value with the overall male attribute value, wherein comparing the overall female attribute value with the overall male attribute value comprises determining whether a difference between the overall female attribute value and the overall male attribute value satisfies a threshold, and based on a result of the comparing, providing a notification for display, wherein the notification includes a prompt encouraging a user to decrease the difference between the overall female attribute value and the overall male attribute value.

* * * * *